United States Patent

Dail et al.

Patent Number: 5,953,344
Date of Patent: Sep. 14, 1999

[54] METHOD AND APPARATUS ENABLING ENHANCED THROUGHPUT EFFICIENCY BY USE OF DYNAMICALLY ADJUSTABLE MINI-SLOTS IN ACCESS PROTOCOLS FOR SHARED TRANSMISSION MEDIA

[75] Inventors: James E. Dail, Marlboro; Chia-Chang Li, Holmdel; Peter D. Magill, Freehold; Kotikalapudi Sriram, Marlboro, all of N.J.

[73] Assignee: Lucent Technologies Inc., Murray Hill, N.J.

[21] Appl. No.: 08/762,789

[22] Filed: Dec. 10, 1996

Related U.S. Application Data

[60] Provisional application No. 60/016,496, Apr. 30, 1996.

[51] Int. Cl.⁶ .............................. H04L 5/22; H04Q 11/04
[52] U.S. Cl. ......................... 370/443; 370/461; 370/465
[58] Field of Search ............................. 370/395, 443, 370/461, 465, 468

[56] References Cited

U.S. PATENT DOCUMENTS

| | | | |
|---|---|---|---|
| 4,641,304 | 2/1987 | Raychaudhuri | 370/447 |
| 5,012,469 | 4/1991 | Sardana | 370/348 |
| 5,384,777 | 1/1995 | Ahmadi et al. | 370/337 |
| 5,570,355 | 10/1996 | Dail et al. | 370/352 |
| 5,590,131 | 12/1996 | Kabatepe | 370/461 |
| 5,790,806 | 8/1998 | Koperda | 395/200.82 |

*Primary Examiner*—Melvin Marcelo
*Attorney, Agent, or Firm*—Joseph J. Opalach

[57] ABSTRACT

A head-end dynamically allocates bandwidth of a communications channel as a function of the type of communications traffic. In particular, the head-end communicates to subscriber stations via a broadband cable network using an access protocol, which is modified to provide a variable number of mini-slots and a variable number of data slots in each frame. Each mini-slot is used to request assignment of a data slot(s) to subscriber stations for the communication of information and, also, as a vehicle to resolve contention between subscriber stations. The head-end dynamically adjusts the number of mini-slots over a period time as a function of the type of communications traffic, e.g., bursty and isochronous traffic sources. Any variation in the number of mini-slots concomitantly effects the number of data slots available to communicate information. For example, less mini-slots provides more data slots. As a result, the dynamic adjustment of the number of mini-slots allows the head-end to more efficiently allocate bandwidth on the communications channel.

23 Claims, 19 Drawing Sheets

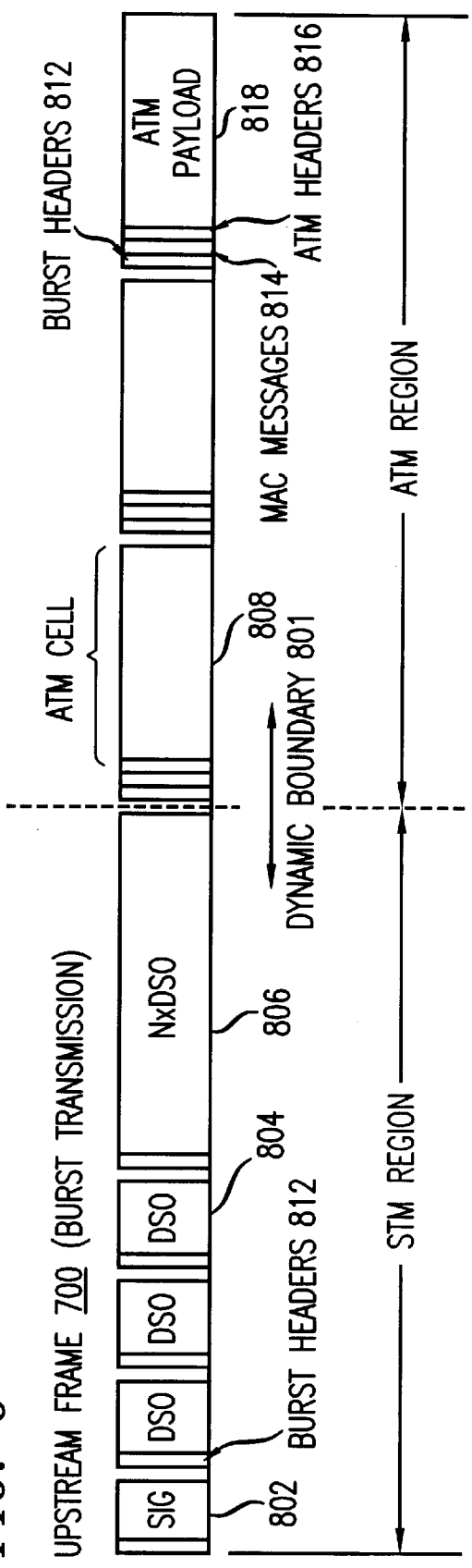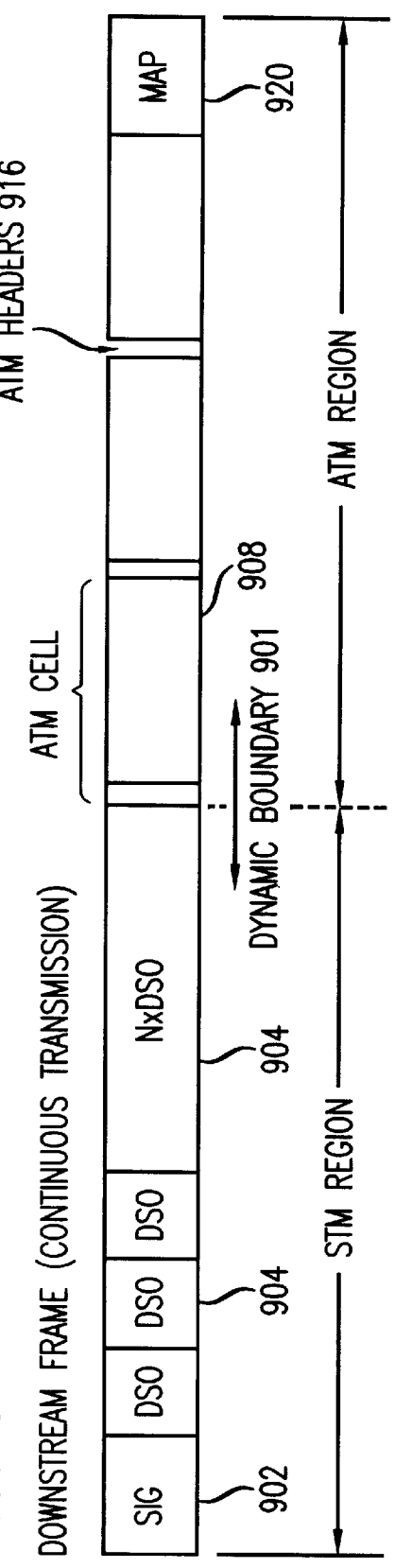
FIG. 6
FIG. 7

NUMBER OF MINI-SLOTS VS. RESERVATION TRAFFIC LOAD
NUMBER OF MINI-SLOTS = ($j_v$ OR $j_f$) * k

METHOD AND APPARATUS ENABLING ENHANCED THROUGHPUT EFFICIENCY BY USE OF DYNAMICALLY ADJUSTABLE MINI-SLOTS IN ACCESS PROTOCOLS FOR SHARED TRANSMISSION MEDIA

CROSS-REFERENCE TO RELATED PROVISIONAL APPLICATION

This application claims the benefit of the Apr. 30, 1996, filing date of provisional Application Ser. No. 60/016496 entitled "Method and Apparatus Enabling Enhanced Throughput Efficiency By Use of Dynamically Adjustable Mini-Slots in Access Protocols for Shared Transmission Media".

FIELD OF THE INVENTION

This invention relates generally to communications via a two-way communication medium (e.g. fiber, coaxial cable, and wireless), and, in particular, to an access protocol and arrangement for allowing competing stations to communicate a variety of types of information, or traffic, that may be synchronous, asynchronous, or sporadic, such as voice, video-telephony, data, or control information.

BACKGROUND OF THE INVENTION

There is currently a great deal of activity directed toward enhancing the fiber-coax networking infrastructures, such as those used by cable television and telephone companies and referred to herein as "broadband cable." The thrust is two-fold: enhancing the downstream capacity of the networks to support new services, and providing for significant upstream capacity for new interactive services, including telephony and data networking. Here, "upstream" refers to transmission from a station to a head-end (or central office), and "downstream" refers to transmission from a head-end to the stations.

Many current plans for providing upstream capability utilize the well known Time Division Multiple Access (TDMA) method of assigning bandwidth to stations that have invoked a signaling method to indicate to the head-end that they wish to transmit. However, existing versions of TDMA do not provide as much flexibility in the use of the available bandwidth as is desired. Also, TDMA allocates peak bandwidth for the entire duration of a call, and thus does not take advantage of the statistical nature of the traffic.

Existing packet data solutions also do not extend well to the broadband cable environment. For example, Carrier Sense Multiple Access/Collision Detection (CSMA/CD) as described in "Carrier Sense Multiple Access with Collision Detection (CSMA/CD) Access Method and Physical Layer Specifications," published by the Institute of Electrical and Electronics Engineers, American National Standard ANSI/IEEE Std. 802.3-1985, is arranged so that stations listen to the channel for a period to determine that it is IDLE before transmitting. This type of arrangement is very inefficient in the cable environment, because of the distances involved and the fact that the shared upstream channel cannot be "heard" by all subscribers. The propagation delay, and corresponding dead time of the channel, is much greater in cable networks than in the Local Area Networks that are the standard CSMA/CD environment.

As another packet example, the slotted Aloha approach described by L. Roberts in "ALOHA Packet System With and Without Slots and Capture," Computer Communications Review, April 1975, specifies a system arranged so that time is divided into a series of exact slot periods. Any station that has data may transmit at any time. When collisions occur, stations back off and retransmit according to some randomized algorithm. This approach has also been enhanced with a reservation scheme in which once a station acquires a slot, it can keep successive slots by setting a header field; the station may also signal that it has finished transmitting by changing that field. See, for example, Lam, S. S. Packet Broadcast Networks—A performance analysis of the R-ALOHA Protocol, IEEE Transactions on Computers, Vol. C-29, No. 7, July 1980, 596–603. Here again, the problem is that in the coax/fiber infrastructure under consideration, it is difficult to allow stations to directly listen to each other. Also, the unique tree and branch structure of the cable network requires that a new approach be used.

Also very important is the capability of an access protocol to serve the needs of both Synchronous Transfer Mode (STM) and Asynchronous Transfer Mode (ATM) applications. Many new applications, such as high speed data and MPEG-2 video, are likely to be transported using ATM techniques from a home or office. At the same time, applications such as voice and video telephony are likely to continue being transported using STM, for reasons of delay, error sensitivity, etc.

A technique known as DQDB, described in "IEEE 802.6: Distributed Queue Dual Bus Access Method and Physical Layer Specifications," is applicable for networks spanning a metropolitan area. However, DQDB employs a dual-bus structure and requires a well-defined upstream-downstream relationship between adjacent stations. It is possible to design a system to fulfill these architectural requirements for tree and branch networks, but the scheme would be very complicated and the cost would be extremely high.

Recently, a variation of DQDB, called Extended Distributed Queuing Random Access Protocol (XDQRAP), has been proposed by C. Wu and G. Campbell, "Extended DQRAP: A Cable TV Protocol Functioning as a Distributed Switch," Proc. of 1st International Workshop on Community Networking, San Francisco, Jul. 13–14, 1994, pp. 191–198. One of the drawbacks of this proposal is that it does not support both STM and ATM techniques. In its present form, it does not accommodate bursts of various lengths for different payloads, as required for STM connections. Further, the physical layer overhead (i.e., guard time and preamble) is very high, due to the requirement that a fixed number of multiple request mini-slots be associated with each data slot.

Accordingly, there remains a strong need for an access protocol for broadband tree and branch networks that adapts to the changing demands of a mix of STM and ATM applications, and efficiently allocates bandwidth to a variety of bursty and isochronous traffic sources. As a result, a U.S. Pat. No. 5,570,355, issued Oct. 29, 1996, to Dail et al., entitled "Method and Apparatus Enabling Synchronous Transfer Mode and Packet Mode Access for Multiple Services on a Broadband Communications Network," and assigned to the same assignee as the present application, presented an access arrangement for dynamically altering a boundary between ATM-type traffic and STM-type traffic occurring in a frame based upon an ATM-oriented access protocol. This access protocol is also referred to herein as ADAPt.

SUMMARY OF THE INVENTION

Although the above-mentioned ADAPt protocol provides an efficient mechanism for allocating bandwidth between STM and ATM traffic, we have realized another way to improve the efficiency of bandwidth allocation in an access protocol. In particular, and in accordance with the inventive concept, a head-end communicates to subscriber stations via a broadband cable network using an access protocol, which is modified to support a variable number of mini-slots and a variable number of data slots in each frame. The head-end dynamically adjusts the number of mini-slots over a period time as a fimction of the type of communications traffic.

In an embodiment of the invention, a head-end communicates to subscriber stations via a broadband cable network using the ADAPt protocol, which is modified to support a variable number of mini-slots and a variable number of data slots in each frame. Each mini-slot is used to request assignment of a data slot(s) to subscriber stations for the communication of information and, also, as a vehicle to resolve contention between subscriber stations. The head-end dynamically adjusts the number of mini-slots over a period of time as a function of the type of communications traffic, e.g., bursty or isochronous traffic sources. Any variation in the number of mini-slots concomitantly affects the number of data slots available to communicate information among a variety of subscriber stations. For example, less mini-slots provides more data slots. As a result, the inventive concept allows the head-end to more efficiently allocate bandwidth on the communications channel on a traffic-dependent basis.

BRIEF DESCRIPTION OF THE DRAWING

FIGS. 6 and 7 illustrate fuirther details of typical arrangements of upstream and downstream time frames, respectively, and, in particular, show the positions of headers and other frame signaling messages;

DETAILED DESCRIPTION

Figure 1:
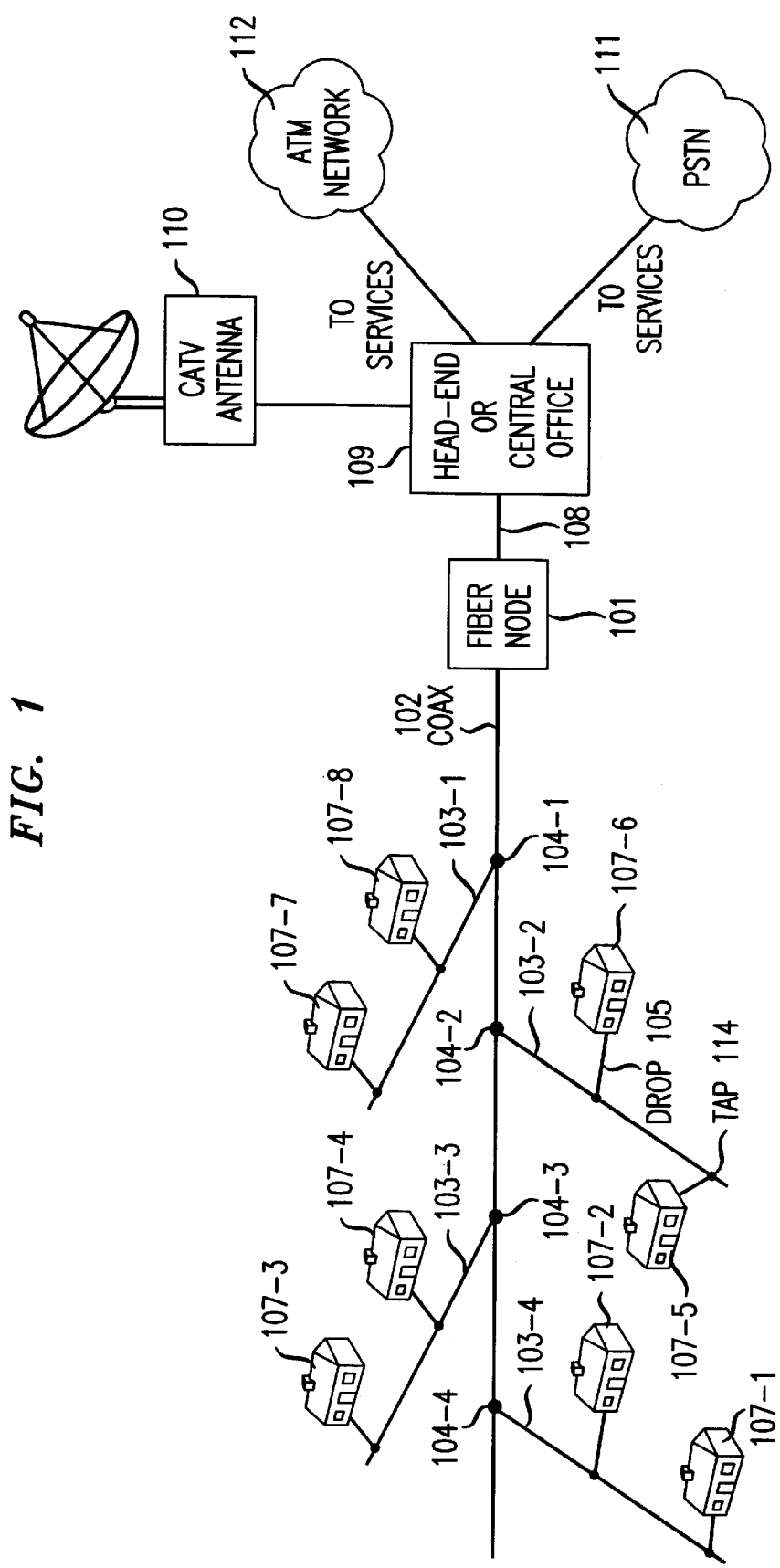
FIG. 1 illustrates the overall arrangement of a broadband network in which a plurality of stations are interconnected with a common controller called a head-end, by a tree and branch transmission network, and in which the present invention may be used.

The type of broadband network in which the present invention may be used is shown in FIG. 1. A plurality of stations 107-1 to 107-8 are connected to a common head-end 109 by a tree and branch transmission network. The transmission network can include a main coaxial cable 102 having a plurality of taps 104-1 to 104-4, each of which serves a corresponding feeder cable 103-1 to 103-4. Each feeder cable in turn serves one or more of the stations 107 via a tap 114 and a drop, such as drop 105. The network in FIG. 1 includes, for each serving area, a single fiber node 101 which permits a transition between main coaxial cable 102 and an optical fiber 108. However, it is to be noted that the entire network can consist of coaxial cable in some implementations, and in others, more than one such fiber node can be employed in the network, depending upon which portions of the network are fiber and which are coaxial cable.

By virtue of taps 104, which are often directional, in the tree and branch arrangement illustrated in FIG. 1, individual stations cannot communicate with or "hear" each other, and therefore, conventional access protocols cannot be used efficiently. Rather, each of the stations communicates in the upstream direction with a common controller located in a head-end or central office 109, while the head-end can broadcast downstream (on coax 102 and fiber 108) to all of the stations or transmit selectively to certain stations, using well known addressing techniques. In the rest of the ensuing description, the terms "common controller" or "head-end" are used interchangeably, with the understanding that the common controller is located in a head-end. Also, it may be noted that some implementations of the present invention may involve a central office in place of a head-end. The arrangement of FIG. 1 is further assumed to include unidirectional, upstream and downstream amplifiers (not shown) that also prevent all stations from hearing all other stations. A typical network of the type shown in FIG. 1 may involve distances in a range up to 100 miles from the farthest station to head-end 109.

The traffic anticipated in coax/fiber networks of the type shown in FIG. 1 can be broadly classified as analog traffic, synchronous transfer mode (STM) traffic, variable length packet traffic, and asynchronous transfer mode (ATM) traffic. An example of analog traffic is the conventional analog CATV. Examples of STM traffic applications are voice, narrow-band ISDN (Integrated Services Digital Network), and video telephony, which require bursts of different length and are normally multiplexed using Time Division Multiple Access (TDMA) techniques. Examples of variable length packet traffic are Internal Protocol (IP) traffic, Ethernet traffic, etc. Variable length packet traffic may also be supported via ATM using "AAL-5" (ATM Adaptation Layer 5). With AAL-5 adaptation the variable length packets result in multi-cell ATM traffic. The ATM traffic can be further classified as (a) constant bit rate (ATM/CBR), (b) delay sensitive variable bit rate (ATM/VBR), (c) delay tolerant ATM/VBR, and (d) ATM/contention. An application such as voice or video telephony in ATM form could be categorized as ATM/CBR; an interactive data application is an example of delay sensitive ATM/VBR; a file transfer is an example of delay tolerant ATM/VBR; and upstream signaling and VCR remote control messages for VOD (video-on-demand) and button push messages for video games are examples of ATM/contention. ATM/contention traffic is essentially sporadic in nature, consisting of occasional bursts of one or more packets or cells.

Note that sometimes, delay insensitive traffic, like that generated by a file transfer, may also be served using an ATM/CBR connection. Note also that VBR video can be transported through the network as ATM/VBR traffic, but it requires resynchronization at the receiving station before display on a video monitor. The asynchronous or VBR traffic is bursty, due to variations in activity/inactivity periods and potentially variable bit rates during the activity periods. Sporadic traffic is also bursty, but is characterized by relatively long inactivity periods followed by bursts of one or a few packets.

As illustrated in FIG. 1, calls requiring service beyond the area covered by head-end 109 are transmitted by the head-end to various service providers. These providers include Public Switched Telephone Network (PSTN) 111, ATM network 112, as well as other similar facilities, such as other wide-area networks. The CATV antenna 110 is used for reception of cable TV programming, at head-end 109, which may be transmitted to stations 107 in downstream analog broadcast channels 201 (FIG. 2) on the fiber/coax transmission medium.

Figure 2:
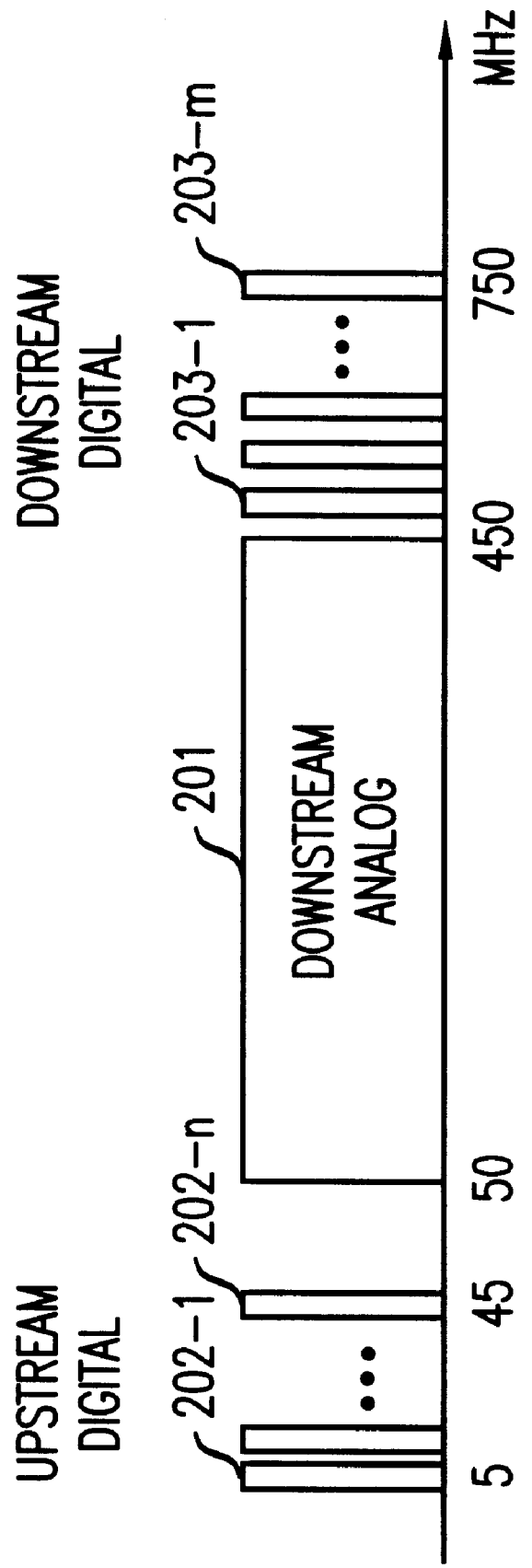
FIG. 2 illustrates an example of the upstream/downstream spectrum allocation that may be used on the transmission medium interconnecting the stations and head-end shown in FIG. 1.

FIG. 2 illustrates an upstream/downstream spectrum allocation that may be used in the transmission network interconnecting stations 107 to head-end 109. Assuming that a total bandwidth of at least 750 MHz is available on all of the components of the network, a 400 MHz band 201 from 50 MHz to 450 MHz may be used to carry conventional downstream analog information, such as conventional cable TV programming. A 40 MHz band between 5 and 45 MHz can be divided into a plurality of upstream digital channels 202-1 to 202-n, each of which can be 1 MHz to 6 MHz wide, and capable of carrying 1.6 Mb/s to 10 Mb/s digital bandwidth when used with a suitable modulation scheme. Each of these upstream digital channels can be used for carrying control, signaling, voice, video telephony and other messages in the upstream direction. A larger number, typically 50, of downstream digital channels 203-1 to 203-m can be included in the 300 MHz band between 450 and 750 MHz. These channels can be used for the downstream component of voice, video telephony, video on demand (VOD), and other interactive (ITV) services. Due to the lower noise in the downstream channels (as compared to the upstream channels), with suitable modulation schemes, it is possible to carry up to 28 (or even 40) Mb/s in each of the downstream channels 203-1 to 203-n. The upstream channels 202 are shared by the stations 107 using a multiple access method, described below. The downstream channels 201 and 203 are "broadcast" channels, in that all stations 107 can receive the messages transmitted in those channels. It should be noted that the present invention can operate with any spectrum allocation and bit rates, including and other than those discussed in the context of FIG. 2.

For the purposes of illustration only, it is assumed that the broadband cable network of FIG. 1 uses the ADAPt access protocol as described in the above-mentioned patent application of Dail et al. and as modified in accordance with the inventive concept, described below. Also, it should be realized that although the inventive concept is described in the context of the ADAPt access protocol, the inventive concept applies to other access protocols as well.

However, before describing the inventive concept, a general overview of the ADAPt access protocol, as it relates to the inventive concept, is provided. More information on the ADAPt access protocol, if desired, can be found in the above-mentioned patent application of Dail et al.

Figure 3:
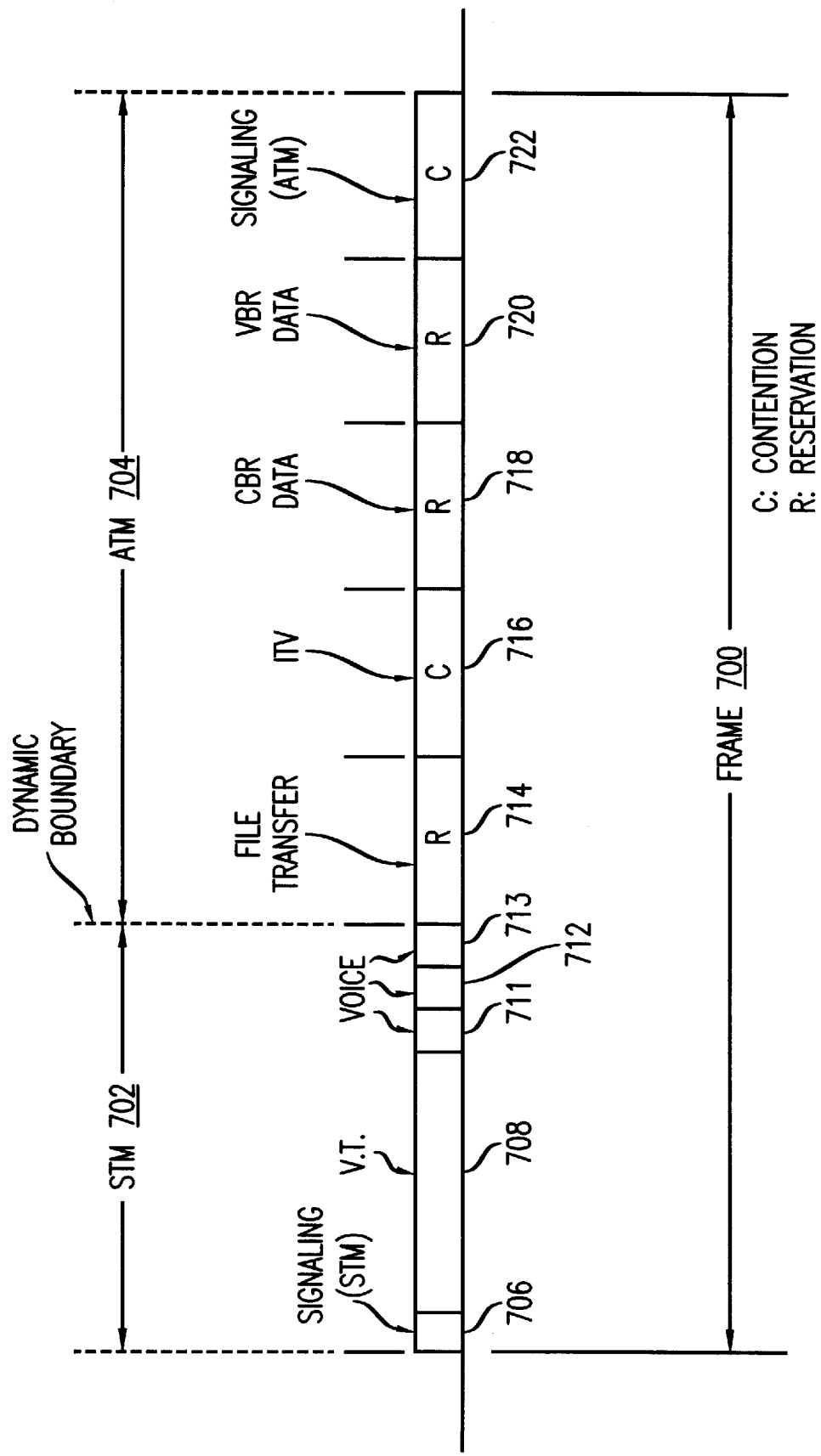
FIG. 3 illustrates a typical arrangement of different traffic types within an upstream time frame.

The ADAPt access protocol dynamically allocates bandwidth by dynamically altering a boundary between ATM-type traffic and STM-type traffic occurring in a frame based upon an ATM-oriented access protocol as illustrated in FIG. 3, which shows the time slot allocations in an upstream frame 700 at a typical instant. This figure also illustrates the different types of STM and ATM services that are supported by the ADAPt access protocol. In the STM region 702, STM signaling is contained in time slot 706, which is shared by contention access by all stations 107 for STM call signaling. Once bandwidth is allocated by head-end 109 (described below), an STM call makes use of a periodic time slot allocation in each frame. For example, in FIG. 3, a video telephony (VT) call, requiring 384 Kbps bandwidth, uses a relatively long time slot 708, while three separate voice calls, each requiring 64 kb/s, use somewhat narrower time slots 711, 712, and 713.

Figure 21:
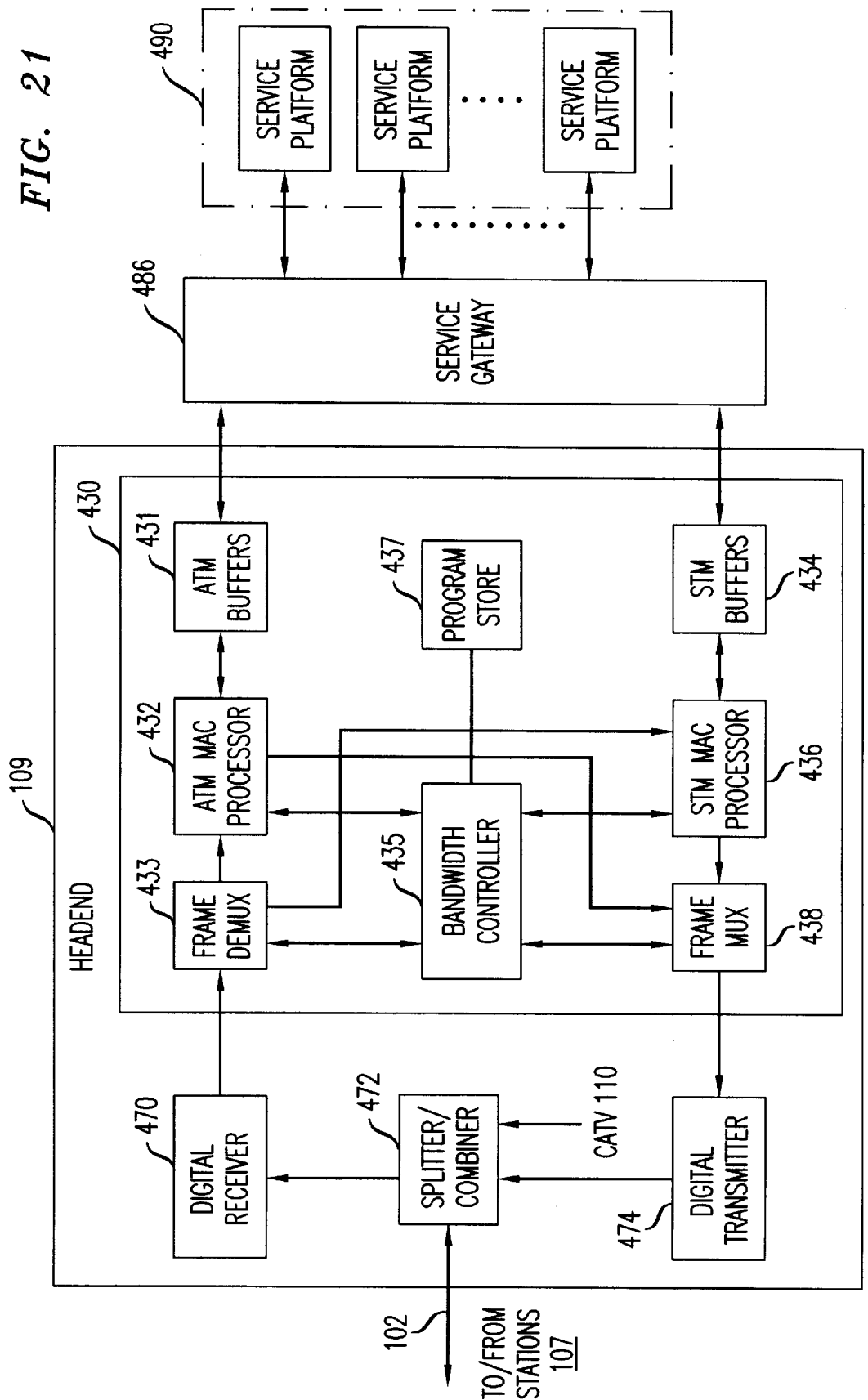
FIG. 21 illustrates the arrangement of a MAC processor similar to the one shown in FIG. 20, which is disposed in the head-end of FIG. 1, and which directs communications signals between the stations and the appropriate service platforms in accordance with the principles of the invention.

Also in FIG. 3, the ATM region 704 of the frame 700 is partitioned into several ATM time slots, each capable of accommodating one ATM cell. These cells are labeled as "R" (Reservation) or "C" (Contention), corresponding to the mode in which they are being used in this frame and as dictated by the head-end bandwidth controller 435 (as shown in FIG. 21 and described later). An ATM/CBR data call requiring a guaranteed fixed bandwidth uses a reservation time slot 718. Such time slot is made available to the call in a periodic manner to provide a fixed bandwidth for the duration of the ATM/CBR call.

When a station is said to have "reserved" time slots, the term "reserved" is used loosely, in the sense that the same number of time slots are allocated periodically over a bandwidth allocation cycle until the call ends or the head-end intervenes to make some re-assignments; however, it does not necessarily mean that specific time slots are allocated in fixed positions within each cycle. A bandwidth allocation cycle refers to either one frame or multiple consecutive frames over which the bandwidth allocation periodicity occurs. "Extra" ATM slots may also be momentarily assigned by the head-end to an ATM/VBR call, because of the availability of some unassigned or idle bandwidth on the link. Whenever a new STM or ATM call set-up requires some guaranteed bandwidth, some or all of the extra bandwidth can be taken away from the calls that currently have it.

An ATM/VBR delay sensitive call also uses a reservation time slot 720. However, this time slot may not be reserved for the entire duration of the call. Instead, it may be reserved only for a burst of data (i.e., group of ATM cells) that is currently being generated by the ATM/VBR source. Time slot allocations for this burst are requested in an upstream ATM/contention time slot such as signaling time slot 722, and the allocation acknowledgment is received in the next downstream ATM MAP message (described below). When this burst is transmitted completely, the periodic allocation of the time slot 720 is terminated for this ATM/VBR call. When the same ATM/VBR source produces another burst of data at a later time, the source would then seek allocation of a new reservation ATM time slot (periodic over one or more frames). An ATM/VBR delay insensitive call, such as a file transfer, also uses a reservation time slot 714. Due to its delay insensitive nature, a file transfer call may be assigned only one ATM time slot in every $n^{th}$ frame where "n" may be large.

As shown in FIG. 3, interactive TV (ITV) and ATM signaling traffic use contention time slots 716 and 722. ATM signaling traffic corresponds to ATM call set-up related messages. Examples of ITV are upstream remote control signals from video on demand (VOD) or button push signals in a video game. Although not shown in FIG. 3, if more than one station transmits in a contention time slot simultaneously, a collision would result, and then the stations would apply a contention resolution scheme.

The ATM/contention traffic, after going through a call admission process, does not individually get any guaranteed bandwidth allocation. Instead, such a call transmits its messages using the ATM time slots designated for "contention" by the head-end (see FIG. 3). The method used for this contention process is based on that described in the previously cited patent application by Dail et al. The downstream STM messages and the ATM MAP, containing information about reservation and contention status of ATM time slots, are transmitted in the STM signaling field and ATM MAP field, respectively, of a downstream frame (described below).

In the contention process, any station that tries to transmit in an ATM/contention time slot reads the status information associated with that time slot that is contained in a broadcast downstream channel in the next, or later, frame. If a time slot is not reserved, a station can insert information. If a time slot is reserved for another station, the station abstains from transmitting in that time slot. If the station detects that its own transmission experienced a collision in the preceding frame (based upon downstream data received the head-end), then the stations attempting the transmission execute a backoff and retransmit process.

Four contention time slot conditions, which are discussed in more detail below, may be indicated by the head-end in a downstream status or acknowledgment message which is part of the MAP message. First, a slot may be IDLE, meaning that the slot was unused in the last frame and is available for transmission by any station. Second, the slot may be marked as BUSY/CONTINUATION, meaning that the slot was busy in the last frame and is reserved in the next frame for the same station. Third, the slot may be marked as BUSY/FINAL, meaning that the slot was busy in the last frame, but is available in the next frame for any station to contend. Finally, the time slot may be marked as COLLISION, indicating that it was corrupted because the slot did not have meaningful data due to collisions or noise.

Figure 4:
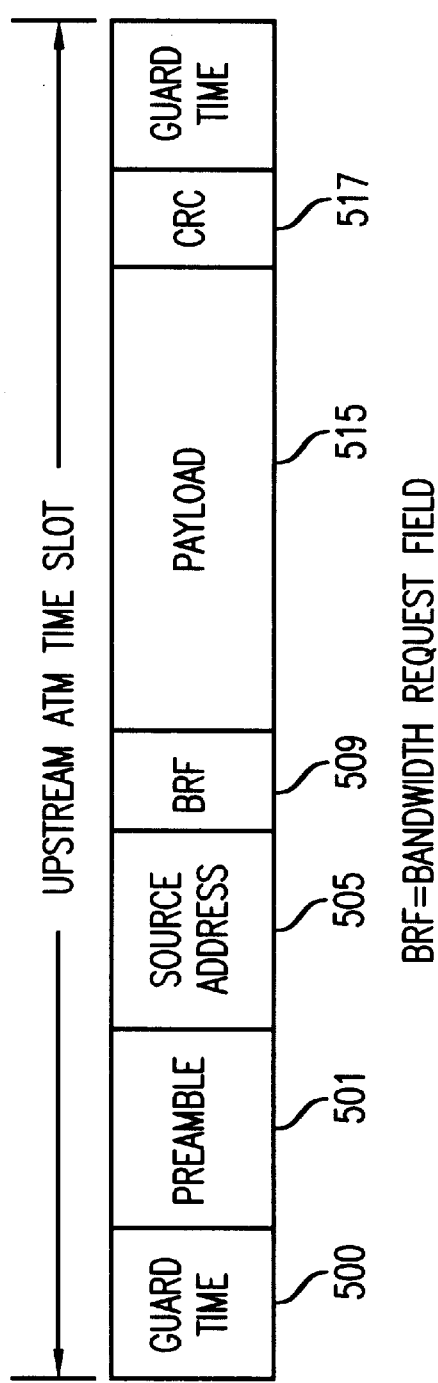
FIG. 4 illustrates the arrangement of the data fields in an upstream message contained within an ATM time slot.
Figure 20:
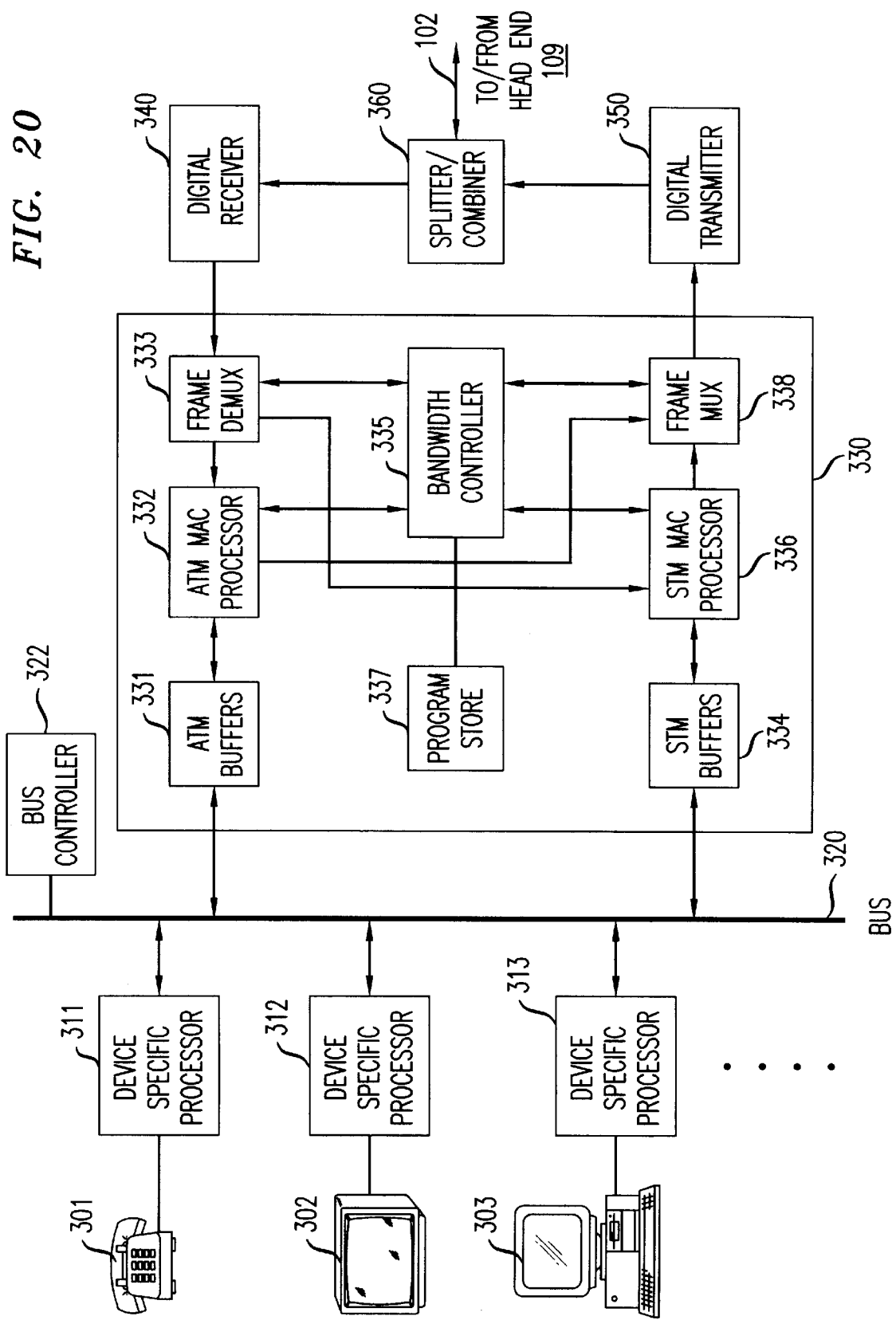
FIG. 20 illustrates the arrangement by which various communications devices in the stations of FIG. 1 are connected to the transmission network as well as the arrangement of the Medium Access Control (MAC) processor.

Referring to FIG. 4, the basic arrangement of data contained in an upstream ATM time slot is shown. A preamble 501 allows synchronization of the receiver in head-end 109 to the time slot. A source address (SA) 505 allows head-end 109 to identify the particular station or communications device 301–303 or device specific processor 311–313 from which the transmission originated (as shown in FIG. 20 and described later). A bandwidth request field (BRF) 509 generally contains information about the bandwidth requested by a call. BRF field 509 may be an actual bandwidth requirement value, or it may specify the type of call, or its parameters, based upon which the head-end makes a decision regarding the bandwidth assignment for that call. Stations transmitting contention traffic may set a subfield in BRF field 509, referred to as continuation bit, to a value "one", to indicate a request for use of the same time slot in the next frame. This provides a mechanism for stations to obtain an initial contention-based access, and then reserve the same ATM contention slot over multiple frames to transmit messages that are multiple ATM cells long. However, if necessary, head-end 109 can exercise overriding control over the station using the continuation indication. When the station does not need that contention time slot in the next frame, it sets the continuation bit to a value "zero".

Although not limited to any particular protocol, the payload 515 in a time slot can accommodate an Asynchronous Transfer Mode (ATM) cell, which is 53 octets long. Cyclic Redundancy Code (CRC) bits 517 are used for the purpose of error detection and correction, and covers all of the slot user data in a manner that would be well known to persons skilled in the art. The use of CRC 517 is optional.

Finally in FIG. 4, a guard time 500 is included in each time slot, at the beginning and end of the time slot, to allow for transmitter turn-on/off times, and time differences caused by propagation delay as messages are carried by the transmission medium from station 107 to head-end 109. All stations 107 on the coaxial cable 102 initially go through a coarse ranging process with head-end 109, so that they have the same view of timing with respect to the time slots that appear on the transmission medium provided by coaxial cable 102 and fiber 108. This timing synchronization, which is performed in accordance with techniques well known to persons skilled in the art, is then fine tuned with the help of the guard time 500 and preamble 501 within each time slot. The preamble 501 is a preset digital sequence which allows the head-end digital receiver 470 to rapidly acquire clock and synchronization information. All of this allows stations 107 to stay synchronized with the slot boundaries on the transmission medium, while accounting for their distances from each other and head-end 109, and the corresponding propagation delays.

Figure 5:
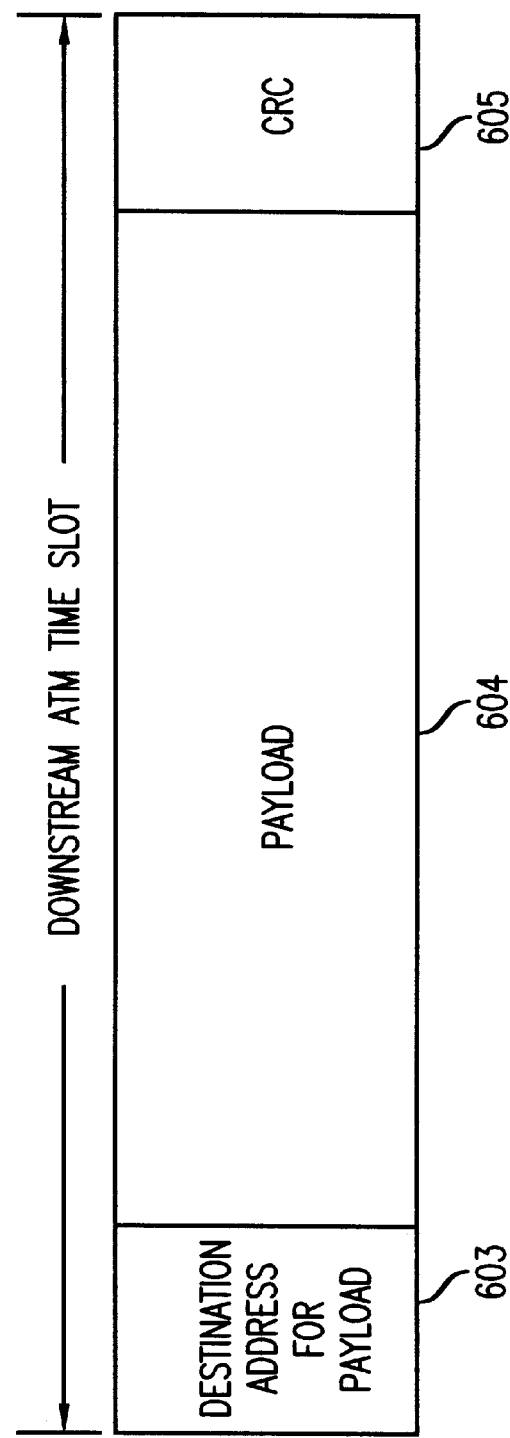
FIG. 5 illustrates the arrangement of the data fields in an downstream message contained within an ATM time slot.

Referring to FIG. 5, there is shown the arrangement of the data fields in a downstream message contained within an ATM time slot of a downstream frame. Field 603 contains the destination address for the payload in the time slot, and field 604 contains the payload. Finally, field 605 contains a cyclic redundancy code (not necessarily identical to the upstream CRC 517), used for error detection (and correction) purposes. The use of CRC 605 is optional.

Now referring to FIGS. 6 and 7, it may be noted that in the upstream direction, stations 107 transmit in a "burst" transmission mode, and in the downstream direction, head-end 109 transmits in a "continuous" transmission mode. The stations go through a ranging process and transmit or "burst" based on timing information received from the head-end. Each station uses guard times and preambles (see FIG. 4) to avoid interference with adjacent time slots in which another station may transmit. However, in the downstream direction, the transmission channel is controlled and used only by head-end 109. Therefore, there is no need for guardtimes or preambles, and the transmission takes place in continuous way.

In FIG. 6, there is shown an upstream frame 700, similar to that of FIG. 4, showing overheads associated with STM and ATM time slots. Associated with each ATM and STM time slot is a burst header 812, which includes guard time 500 and preamble 501 as shown in FIG. 4. Burst header 812 is typically of the same size, whether it is an STM burst of a signaling message 802, or a DS0 804, or an NxDS0 806 call, or a burst corresponding to an ATM cell transmission 808. The source address 505 and BRF 509 (shown in FIG. 4) constitute the MAC message 814 in an ATM burst. The payload in an ATM burst is an ATM cell, which consists of an ATM header 816 and an ATM payload 818. As described in the above-mentioned patent application of Dail et al., the boundary 801 between the STM and ATM regions is movable or dynamic, depending on arrivals and departures of STM and ATM calls.

In FIG. 7, there is shown a downstream frame. The STM region (to the left of boundary 901) consists of time slots corresponding to STM signaling 902, DS0 904 (e.g. voice) and NxDS0 906 (e.g. video telephony), and the ATM region (to the right of boundary 901) consists of one or more ATM cells 908 which include headers 916. MAP field 920 carries control and status information from the head-end 109 to the stations 107. It indicates the status of contention time slots in the previous frame and also informs stations of the bandwidth (or time slot) allocations in the next upstream frame. The boundary between the STM and ATM regions of the frame shown in FIG. 7 is dynamic in a manner similar to that described above for the upstream frame in FIG. 6.

Figure 8:
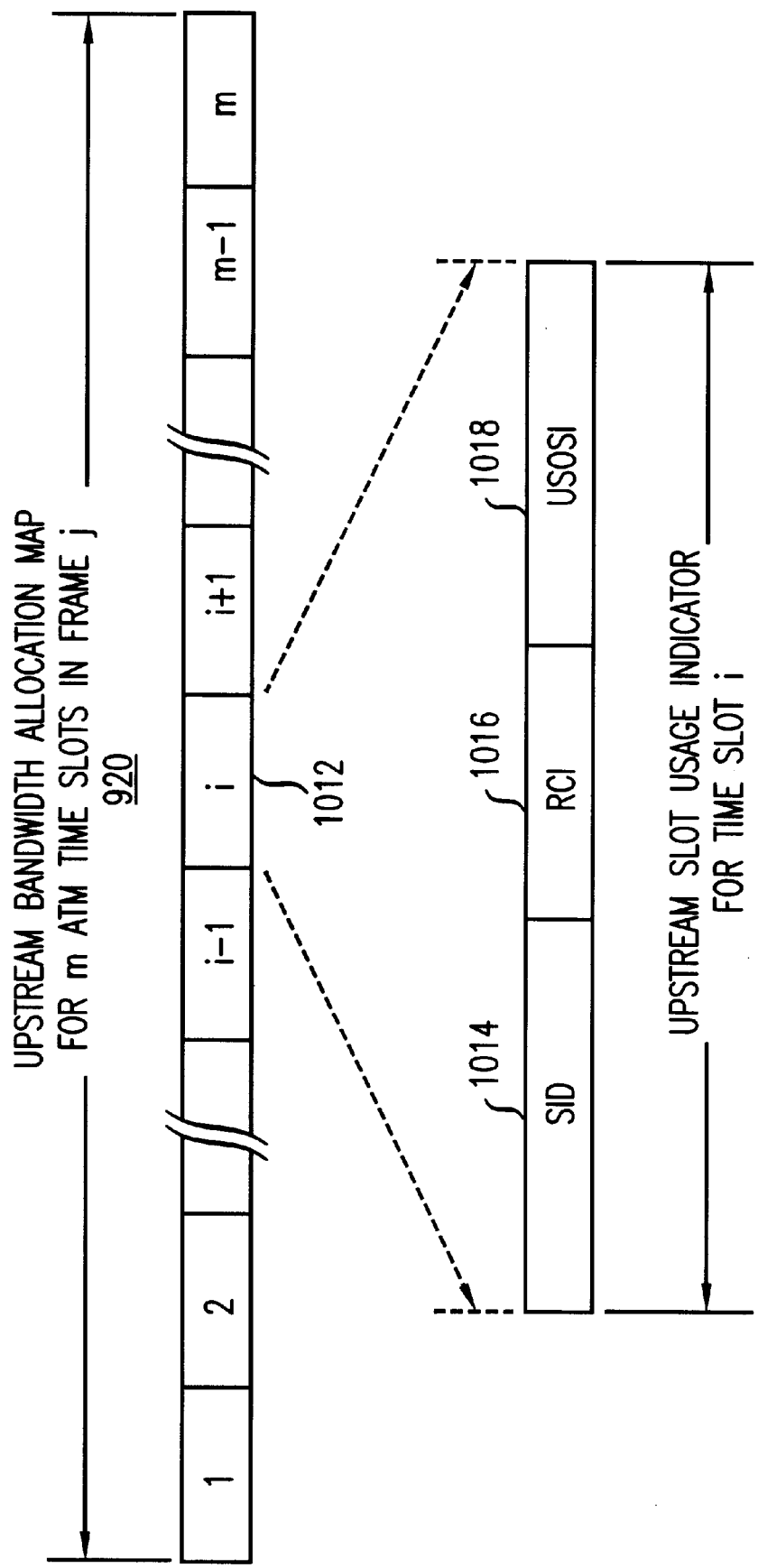
FIG. 8 illustrates the details of the MAP field shown in FIG. 7.

Now referring to FIG. 8, there is shown the contents of a MAP field 920. If there are "m" ATM slots in the ATM region of a frame, there would be "m" segments 1012 in the MAP field, each of which corresponds to one ATM time slot in the downstream frame. The ATM slots are located as close to the end of a frame as possible. Accordingly, the $m^{th}$ ATM time slot is closest to the end of a frame, the $(m-1)^{th}$ time slot is the second closest to the end of a frame, and so on. The number "m" may change from one frame to the next but the length of the MAP field provides that information to the stations. The fields within a segment 1012 of the MAP are also shown in FIG. 8.

The SID field 1014 in the $i^{th}$ segment 1012 provides the station ID of the station which either had a successful transmission (via contention access) in the previous corresponding time slot, or to which the time slot in the next frame is allocated by head-end 109 via a reservation process. The Reservation/Contention Indicator (RCI) field 1016 indicates whether the slot is reserved ("R") or open for contention ("C"). The Upstream Slot Occupancy Status Indicator (USOSI) field 1018 has different meanings depending on the value of the RCI field 1016 in the same segment 1012. The head-end can change the value of the RCI field from C in one frame to R in the next frame or vice-versa. In the case of a contention slot (RCI=C), the USOSI 1018 indicates one of the following conditions: (a) IDLE, (b) COLLISION (or equivalently noise), (c) BUSY/RESERVED, (d) BUSY/FINAL. The definitions of these conditions are similar to those stated in the earlier cited patent with of Dail et al. When the RCI value is R; i.e., the time slot is reserved; then the USOSI field may be left unused in some implementations. However, the USOSI 1018 may also be used to inform the station of any additional parameters associated with bandwidth allocation and control. For example, the head-end may indicate to the station about the actual bandwidth allocated; i.e., the periodicity and number of ATM cells that will be allocated in the frames that will follow.

In the above description, it was stated that the ATM MAP 920 information is of variable length depending on the number of the ATM time slots in an upstream frame. Alternatively, a fixed length MAP 920 can be used. In such a realization, MAP 920 can always have a fixed number of segments corresponding to the largest anticipated value of "m". For cases when one or more of the segments 1012 are not meant to contain valid MAP information (i.e., when "m" is smaller than the its largest anticipated value), then a special value in the SID field will indicate that the said segment 1012 is invalid and to be ignored (i.e., there is no ATM time slot corresponding to that segment). A fixed length MAP designed and used in this manner may be desirable in some systems.

Figure 9:
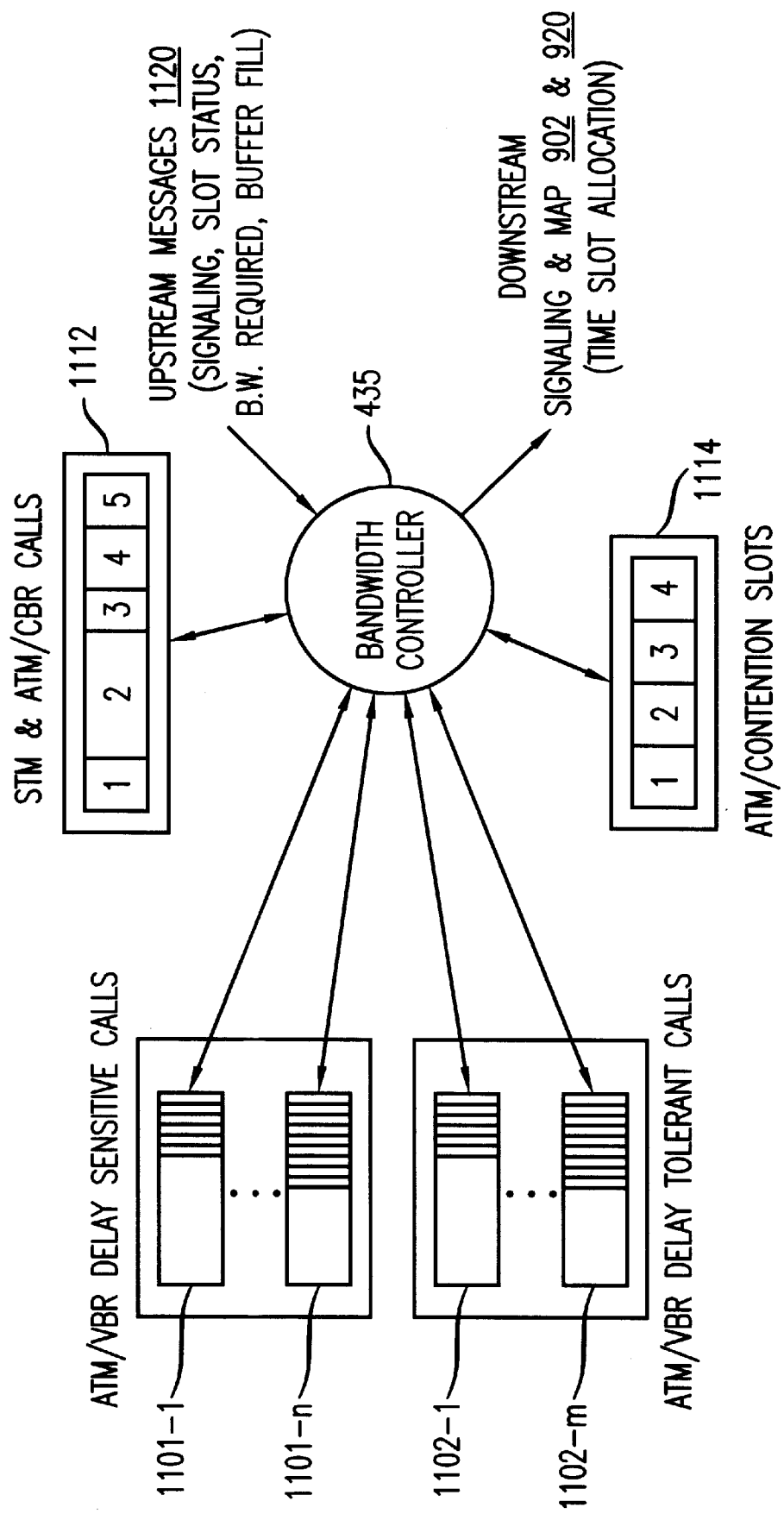
FIG. 9 illustrates, conceptually, the information maintained in the bandwidth controller located in the head-end, for the purposes of bandwidth allocation and management.

In FIG. 9, there is shown the schematic diagram of the view maintained within bandwidth controller 435 at head-end 109 for the purpose of bandwidth allocation and call admission decisions. Bandwidth controller 435 (a) receives upstream messages, such as messages contained in fields 706 and 722 of FIG. 3, and in field 814 of FIG. 6, which include ATM and STM call set-up signaling messages, bandwidth requirements for each call, and buffer fill values at each station 107, and (b) generates downstream signaling messages such as those contained in STM signaling field 902 and ATM MAP 920 of FIG. 7. Based on the information in the upstream messages, bandwidth controller 435 maintains status related to different types of calls. For example, STM and ATM/CBR calls require different amounts of fixed bandwidth for the duration of a call and, accordingly, the bandwidth allocations of these calls is maintained in register 1112. In registers 1101-1 through 1101-n, buffer fill status of the active ATM/VBR delay sensitive calls is maintained. Similarly, in registers 1102-1 through 1102-m, buffer fill status of ATM/VBR delay tolerant calls is maintained. The number and status of stations using ATM contention time slots are maintained in register 1114. The registers shown in FIG. 9 may be part of the bandwidth controller, or they may reside in ATM and STM buffers within the head-end.

Based on this overall view of different types of calls maintained in the different registers, bandwidth controller 435 makes time slot allocation decisions for the next frame or the next several frames. In particular, the locations of the boundaries in the upstream and downstream frames are each determined independently by the bandwidth allocation decisions made in the head-end 109 and as described in the above-mentioned patent application of Dail et al. These time slot allocation decisions are communicated in a downstream channel to each of the stations via downstream signaling 902 and MAP 920 fields in a downstream frame (see FIG. 7).

Although the above-mentioned ADAPt protocol provides an efficient mechanism for bandwidth controller 435 to allocate bandwidth between STM and ATM traffic, we have realized another way to improve the efficiency of bandwidth allocation in an access protocol. In particular, and in accordance with the inventive concept, a head-end communicates to subscriber stations via a broadband cable network using an access protocol, which is modified to support a variable number of mini-slots and a variable number of data slots in each frame. Each mini-slot is used for a) requesting assignment of a data slot(s) to subscriber stations for the communication of information, and, for b) resolving contention between subscriber stations. The head-end dynamically adjusts the number of mini-slots over a period time as a function of the type, or mix, of communications traffic. Any variation in the number of mini-slots concomitantly effects the number of data slots available to communicate information among a variety of subscriber stations. For example, less mini-slots provide more data slots. As a result, the inventive concept allows the head-end to more efficiently allocate bandwidth on the communications channel on a traffic-dependent basis even if the head-end is dynamically adjusting the boundary between STM and ATM traffic as described in the above-mentioned patent application of Dail et al.

In an embodiment of the invention, the above-described ADAPt access protocol is modified to support a variable number of "mini-slots" and a variable number of data slots in each frame. In general, each frame accommodates both STM and ATM traffic as described earlier in the context of FIG. 3. However, for the sake of simplicity, the inventive concept will be described in the context of only ATM traffic. (Note that in applications in which voice and video telephony traffic are transmitted in ATM form between each of the stations and the head-end, all of the traffic carried in the cable distribution network may be ATM traffic; i.e., there are no STM time slots.)

Figure 10:
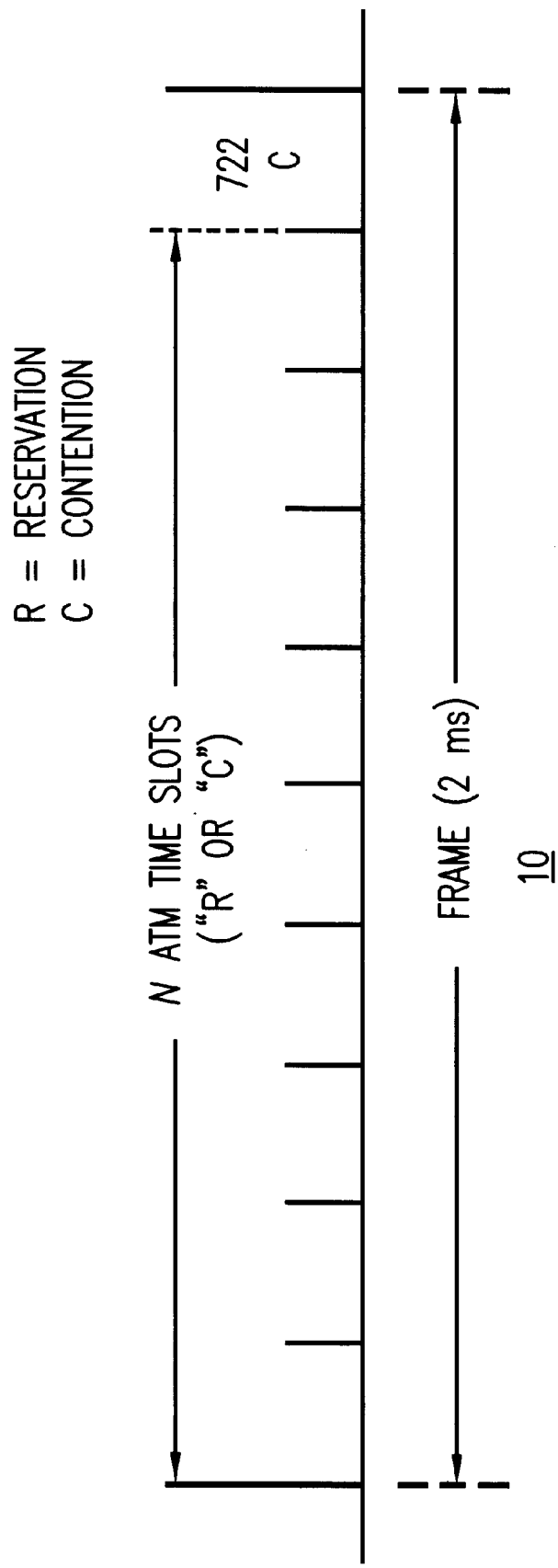
FIG. 10 illustrates an ATM-only frame.

FIG. 10 presents a view of an ATM-only upstream frame 10. (Again, as noted above, it is assumed for simplicity that there is no STM traffic; i.e., there is no STM region 702 as shown in FIG. 3.) Frame 10 comprises N ATM time-slots, or "data cells." As described earlier, these data cells are labeled as "R" (Reservation) or "C" (Contention) corresponding to the mode in which they are being used in this frame and as dictated by the head-end bandwidth controller and data cell 722 is used for signaling.

Figure 11:
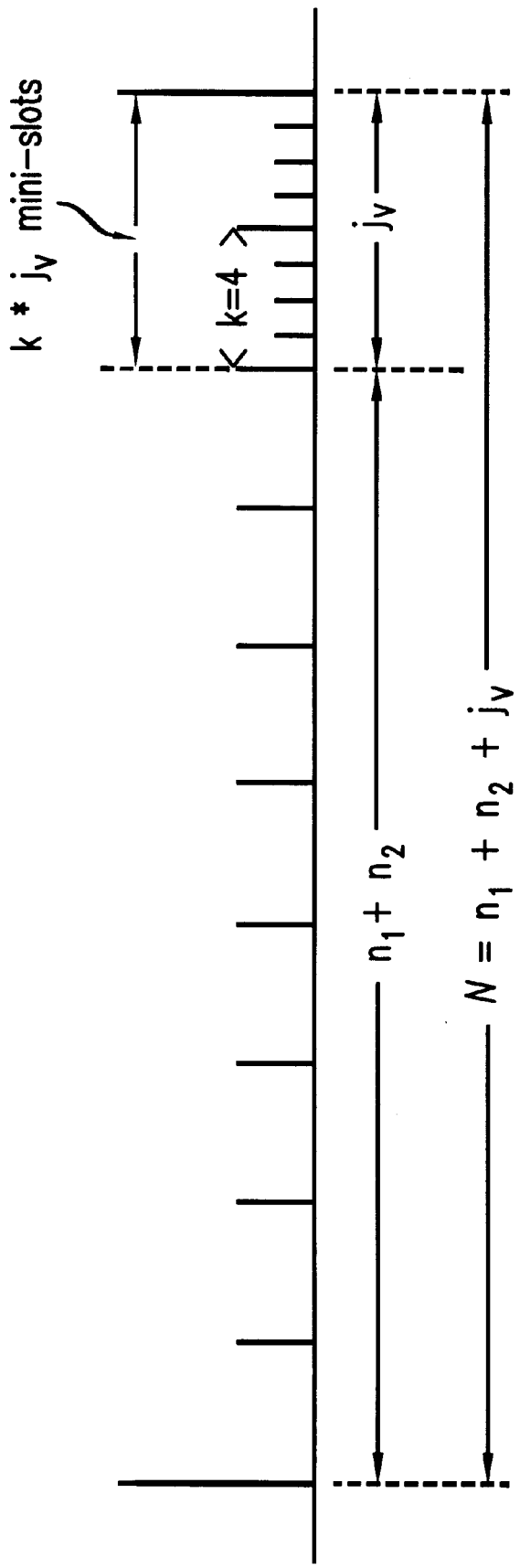
FIG. 11 illustrates the concept of a variable number of mini-slots within an ATM-only frame in accordance with the principles of the invention.

However, and in accordance with the inventive concept, a variable number of "mini-slots" are now used in each upstream frame 20 as shown in FIG. 11. In particular, the frame 20 consists of a total of N time slots of which $j_v$ time slots are each converted to k mini-slots resulting in a total of k $*j_v$ mini-slots. In this example, k is equal to 4. The remaining N–$j_v$ time slots are used for actual data transmission. If $n_1$ time slots are in use by reservation-type traffic (R designated data cells), then $n_2 = N - n_1 - j_v$ are available for contention-type traffic (C designated data cells). The number of slots converted to mini-slots, $j_v$, dynamically varies with traffic mix variations; e.g., reservation and contention traffic. Specifically, $j_v$, (and therefore, $n_2$) is a function of $n_1$, N, and k as described further below.

Figure 12:
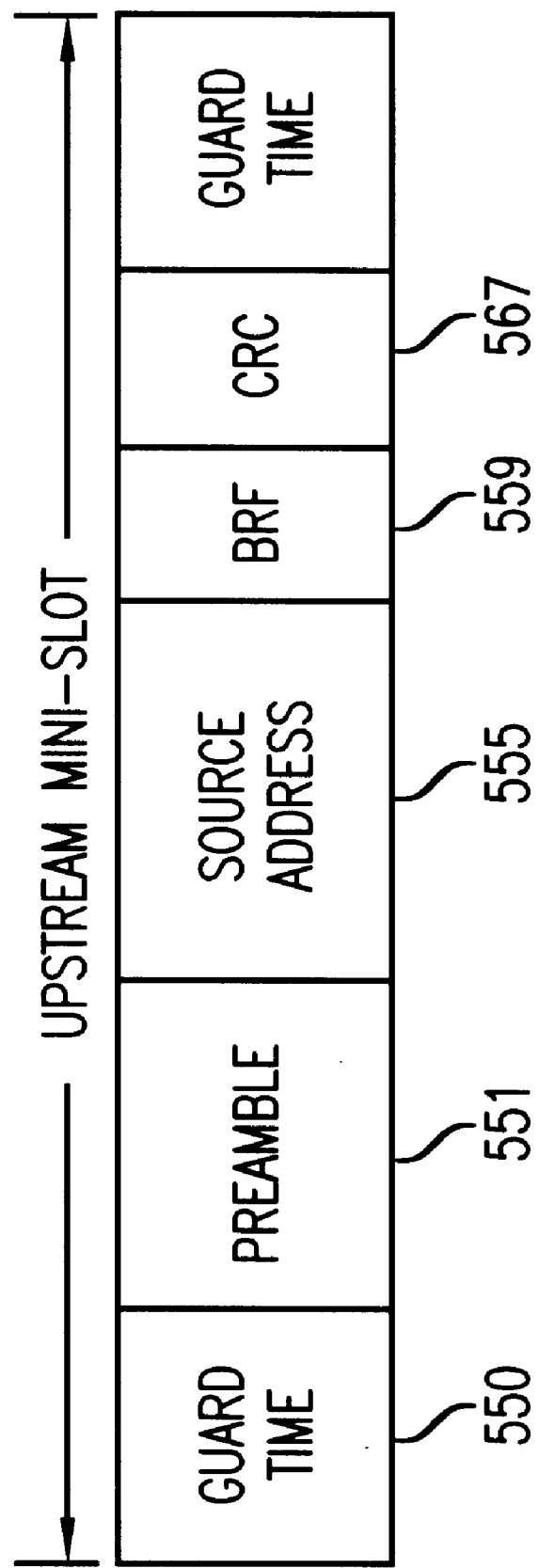
FIG. 12 illustrates the arrangement of the data fields in an upstream message contained within an ATM mini-slot.

Mini-slots are used only for making transmission requests, and do not carry actual data. This is different from ATM signaling slot 722 of FIGS. 3 and 10, which is also used to transmit a packet. As a result, the mini-slot approach (whether fixed or variable) injects a certain amount of overhead into the system since the mini-slots simply request an ATM cell; i.e., no subscriber data is actually transmitted in the mini-slot. However, despite additional transmission overhead associated with the use of mini-slots, they also, in accordance with the principles of the invention, provide potential throughout efficiency benefits under some traffic mix scenarios. For optimal throughput efficiency, the number of mini-slots required would be small when the traffic mix consists of mostly reservation oriented traffic; e.g., file transfers (characterized by long holding time). That is, there are less users contending for the communications channel. Conversely, the number of mini-slots would be larger when the traffic mix is dominated by contention-type traffic; e.g., short messages such as VCR remote control and upstream video gaming messages. In such traffic, more users are now contending (over a period of time) for the communications channel. An illustrative format for a mini-slot is shown in FIG. 12, which is similar to the upstream ATM slot shown in FIG. 4 except for the lack of a payload field.

The following system parameter definitions will be used to further describe the inventive concept:

$\alpha$=physical layer efficiency (accounting for guardbands, preambles, etc.);

N=total # of ATM time slots per frame (including those converted to mini-slots);

k=# mini-slots within an ATM data slot;

$n_1$=number of slots in use by reservation-type traffic; e.g., a file transfer;

$n_2$=number of ATM time slots available for contention-type traffic;

$E_a$=overall efficiency of the ADAPt access protocol without mini-slots;

$E_v$=overall efficiency of the ADAPt access protocol with variable mini-slots;

$S_a$=contention traffic efficiency of the ADAPt access protocol without mini-slots;

$S_v$=contention traffic efficiency of the ADAPt access protocol with variable mini-slots; and $u_1$=transmission bandwidth utilization (%) by reservation-type traffic;

where the subscripts v and a, reference an access protocol with, and without, variable mini-slots, respectively. The value for k depends on $\alpha$ and quantization effects thereof, an illustrative value for k is four.

In addition, the following equations are provided for some of above system parameters:

$n_2 = N - n_1$, for an access protocol without mini-slots;

$n_2 = N - n_1 - j_v$, for an access protocol with variable # mini-slots;

$u_1 = 100 * n_1 \alpha / N$;

$E_a = ([n_1 + \beta(N - n_1)]\alpha / N$, for $0 \leq n_1 \leq N-1$;

$E_v = ([n_1 + \min\{(N - n_1 - j_v), (0.33 \ k \ j_v)\}]\alpha)/N$; and where $\beta$ is defined as the average short message efficiency and, in the context of multi-cell messages (described below) is equal to:

$$\beta = 0.5(0.33) + 0.5(0.6) = 0.465 = 46.5\%.$$

It should be noted that, although not described herein, similar definitions can be made for an access protocol that uses a fixed number of mini-slots; e.g., 2 mini-slots for every data slot independent of traffic mix. In this instance, contrary to this inventive concept, the number of mini-slots does not change with traffic mix variations. However, for comparison purposes only, the following similar definitions are made for an access protocol using a fixed number of mini-slots:

$E_f$=overall efficiency of an access protocol with fixed mini-slots; where $E_f = ([n_1 + \min\{(N - n_1 - j_f), (0.33k \ j_f)\}]\alpha)/N$; and $S_f$=contention traffic efficiency of an access protocol with fixed mini-slots, where the subscript f, references an access protocol with fixed mini-slots.

As noted above, requests for transmission, be it reservation-type traffic or contention-type traffic, are now resolved by the use of mini-slots. However, subscriber equipment must still contend for these mini-slots. In accordance with the inventive concept, the overhead bandwidth used by the total number of mini-slots can be varied as a function of the traffic mix to provide more, or less, payload bandwidth.

For example, if the traffic includes only contention-type traffic; e.g., short messages; then the nature of the contention process is such that each mini-slot resolves requests at the same efficiency as a slotted ALOHA system. That is, each mini-slot will have a throughput efficiency of 37% due to collisions. For practical reasons (primarily delay considerations), this efficiency is assumed herein to be at 33.3% (=0.9*37%). Consequently, three request mini-slots are needed to achieve 100% efficiency in an associated data transmission slot for carrying contention-type traffic. This results in assigning about 3 mini-slots, on average, for each ATM time slot that is designated to carry shorter messages. However, if the traffic includes only reservation-type traffic; e.g., file transfers; fewer than one mini-slot per ATM data slot is needed. In accordance with this, a method for determining the number of time slots, $j_v$, that must carry mini-slots in each frame is shown in flow diagram form in FIG. 13.

Figure 13:
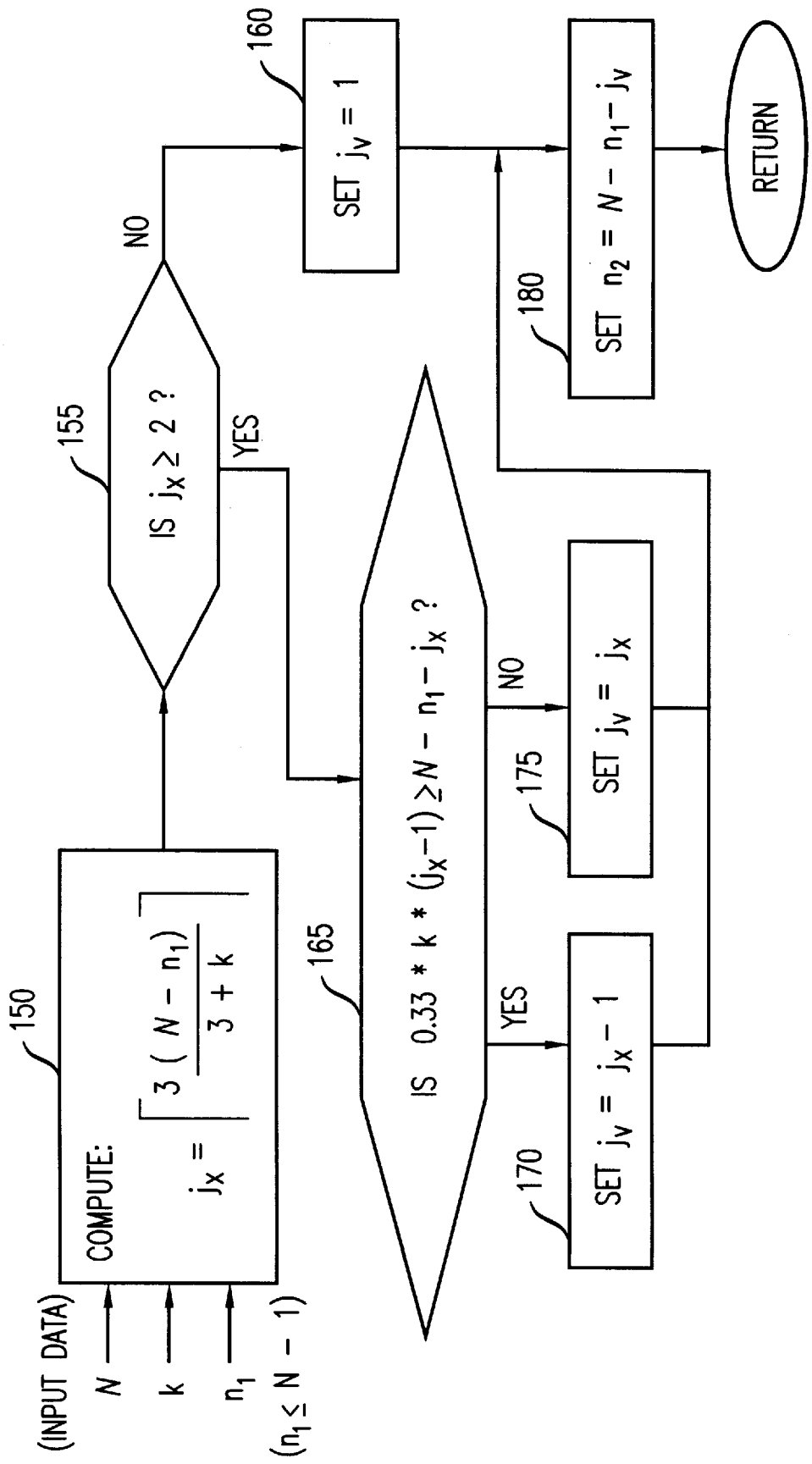
FIG. 13 illustrates a flow diagram of an illustrative method for dynamically determining the number of mini-slots within an ATM frame based upon traffic mix.

It is assumed that the method shown in FIG. 13 is performed by the head-end or central office; e.g., the above-described bandwidth controller 435 modified in accordance with the principles of the invention. This method allows the head-end to dynamically vary the mix of sustained reservation cells versus short message cells. Step 150 provides an initial value, $j_x$, of the number of data cells required to carry mini-slots as a function of N, k, and $n_1$ using a ceiling function. From the total of N time slots available in a frame, $n_1$ are used by reservation-type traffic, where $n_1$ can vary from 1 to (N−1). It should be recalled, that bandwidth controller 435 keeps track of the various call types; e.g., registers 1112, 1114, etc., so that initial values for N and $n_1$ and k are easily determined. In step 155, this initial value of $j_x$ is then compared against the number 2. If the value of $j_x$ is less than the number two, then the value of $j_v$ is set equal to one in step 160, since at least one ATM data cell must carry mini-slots for making transmission requests and resolving contention. However, if the value of $j_x$ is greater than, or equal to, the number two then another comparison is performed in step 165. The latter step fine tunes the selection of the value for $j_v$. In particular, the expression $N-n_1-j_x$, is defined herein as representing the maximum short message throughput; (per frame 20 in FIG. 11) i.e., contention-type traffic; and the expression $0.33(k)(j_x-1)$ is defined herein as representing the maximum request resolution throughput if one less ATM cell is used for carrying mini-slots (under the assumption that the efficiency of each mini-slot is 0.33%). If the maximum request resolution throughput is greater than, or equal to, the short message throughput, then the value of $j_v$ is set equal to one less than the value of $j_x$ in step 170. Conversely, if the maximum request resolution throughput is less than the short message throughput, then the value of $j_v$ is set equal to the value of $j_x$ in step 175. Finally, the number of ATM data cells available for contention-type traffic is determined in step 180 based upon the value of $j_v$.

Figure 14A:
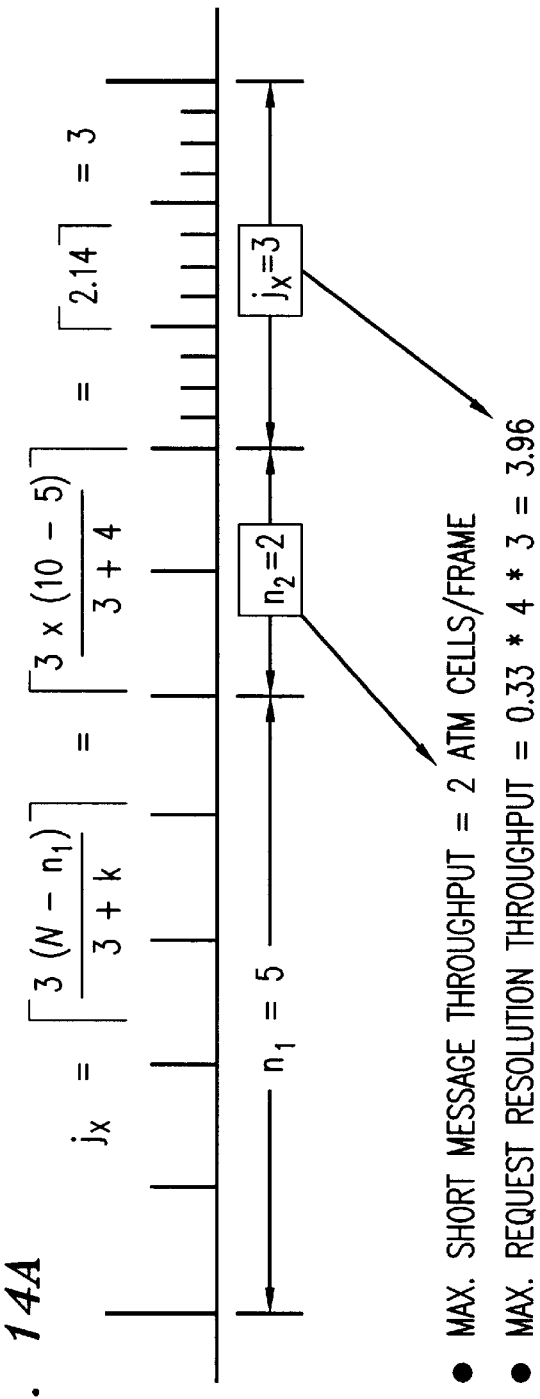
FIG. 14A and 14B illustrates the concepts of maximum short message throughput and maximum request resolution throughput.
Figure 14B:
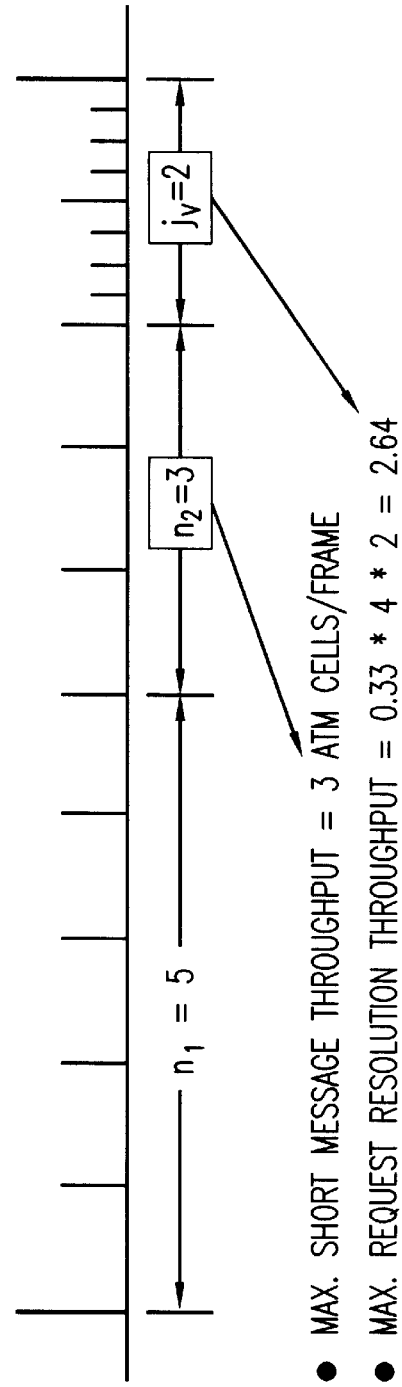

Further illustration of step 165 is shown in FIG. 14, which illustrates the concepts of maximum short message throughput and maximum request resolution throughput for an ATM frame comprising 10 data cells; i.e., N=10; of which 5 are reserved by the head-end; i.e., $n_1=5$. Using the illustrative numbers shown in FIG. 14, $j_v$ is set equal to a value of 2. It should be noted that step 165 uses the maximum short message throughput illustrated in FIG. 14A and the maximum request resolution throughput illustrated in FIG. 14B.

Further refinements to the method of dynamically allocating mini-slots can be made by further characterizations of the traffic mix. For example, assume that the contention-type traffic is further divided into various types of multi-cell messages of sizes (2, 3, 6, 11, 22, 33) in units of ATM cells with probabilities (0.6, 0.06, 0.04, 0.2, 0.25, 0.03), respectively. These probabilities can either be estimated during system operation or may be apriori available when the system is turned on based upon prior traffic measurements. This results in an average contention-type message length, l, of 8.33 cells.

Further, the following system parameters are additionally defined herein:

B=Average contention message size in bytes, including any overhead;

$B_a$=ATM cell time slot size in bytes, including any overhead;

$f_m$=a multiplication factor (used for conservativeness in estimation of mini-slots based on multi-cell short messages, where $f_m \leq 1$); and $l_e$=effective short message length ratio.

Also, the following equations are provided for $l_e$:

$l_e = \max\{[\lfloor lf_m, 1 \rfloor]\}$.

Figure 15:
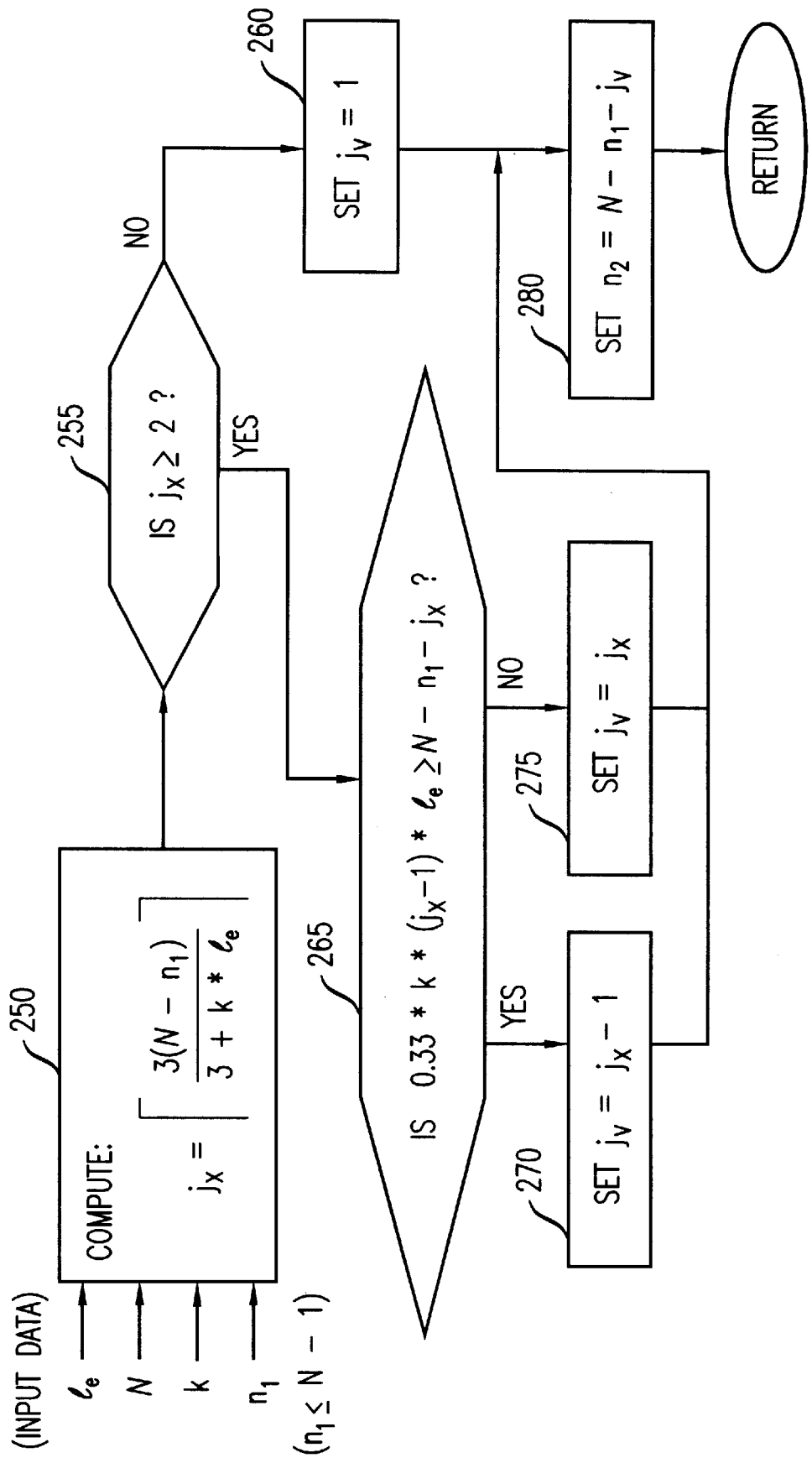
FIG. 15 illustrates a flow diagram of another illustrative method for dynamically determining the number of mini-slots within an ATM frame based upon traffic mix.

A illustrative value of $f_m$ is 0.5 and hence when $1 \geq 4$, $l_e$ helps to reduce the value of the number of mini-slots needed per frame (further illustrated in FIG. 15).

From this traffic characterization, another method for determining the number of time slots, $j_v$, that must carry mini-slots in each frame is shown in flow diagram form in FIG. 15. The flow chart of FIG. 15 is similar to the flow chart of FIG. 13 and will not be described herein except to note the following: The only difference to be noted is that k in FIG. 13 is replaced by $k*l_e$ at steps 250 and 265, so that the effective length of multi-cell messages is used to reduce the value of $j_v$. This is logical because multi-cell messages are required to contend just once for the whole message rather than once for every cell of the message.

Figure 16:
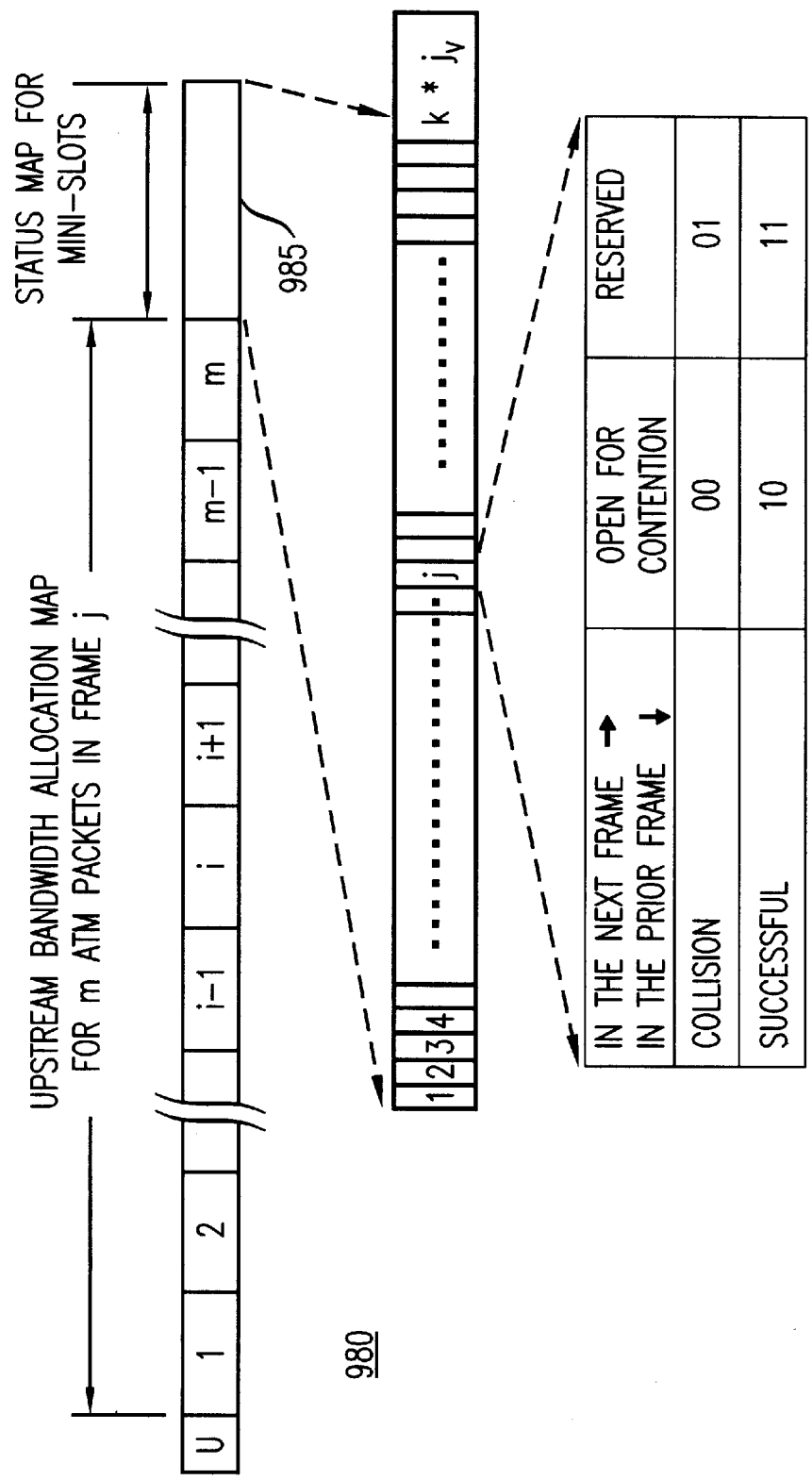
FIG. 16 illustrates the details of a MAP field in accordance with the principles of the invention.

Now referring to FIG. 16, there is shown the contents of a MAP field 980 in accordance with the principles of the invention. FIG. 16 is similar to MAP field 920 of FIG. 8, described above; e.g., if there are "m" ATM slots in the ATM region of a frame, there would be "m" segments in the MAP field, each of which corresponds to one ATM time slot in the downstream frame. Additionally, however, there is a STATUS MAP 985 for indicating the status of the $k*j_v$ mini-slots for either the prior frame or the next frame. For example, if the $i^{th}$ mini-slot was open for contention on the prior frame, but a collision occurred, the respective subscriber stations, upon detection of the value "00," would try again to contend for a mini-slot to make a transmission request.

Figure 17:
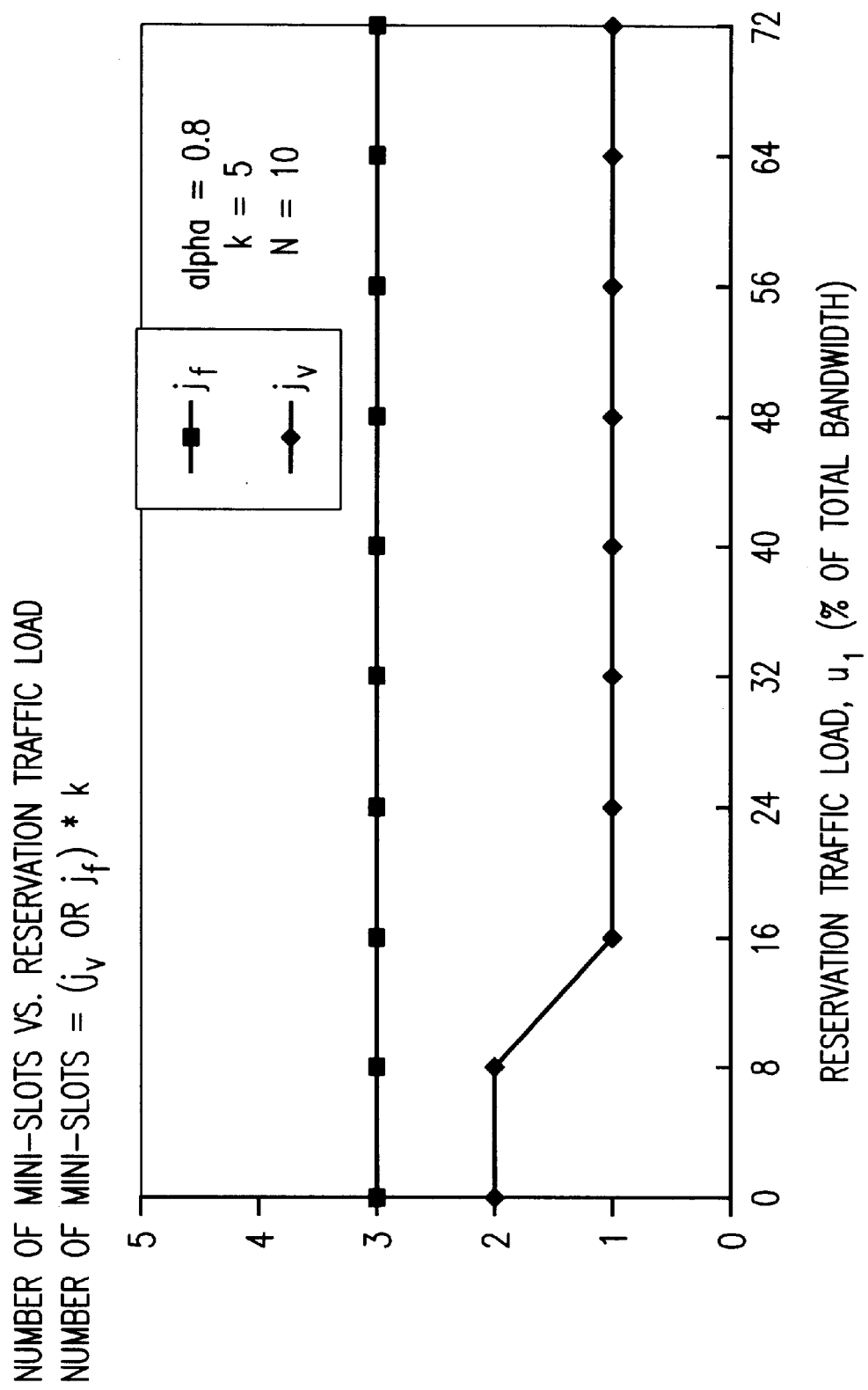
FIGS. 17–19 are illustrative comparative plots further illustrating the inventive concept for $\alpha=0.8$, $k=5$ and $N=10$.
Figure 18:
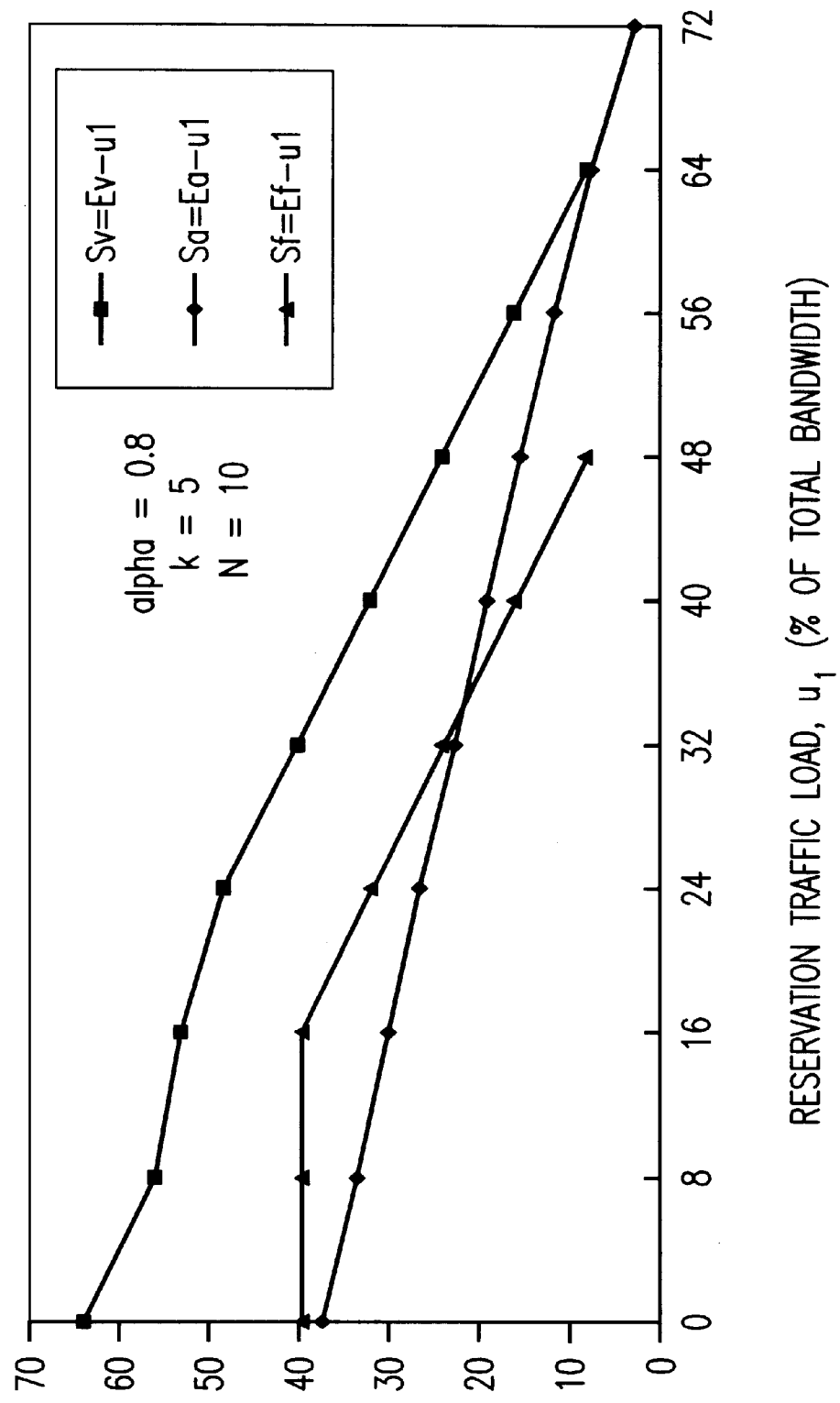
Figure 19:
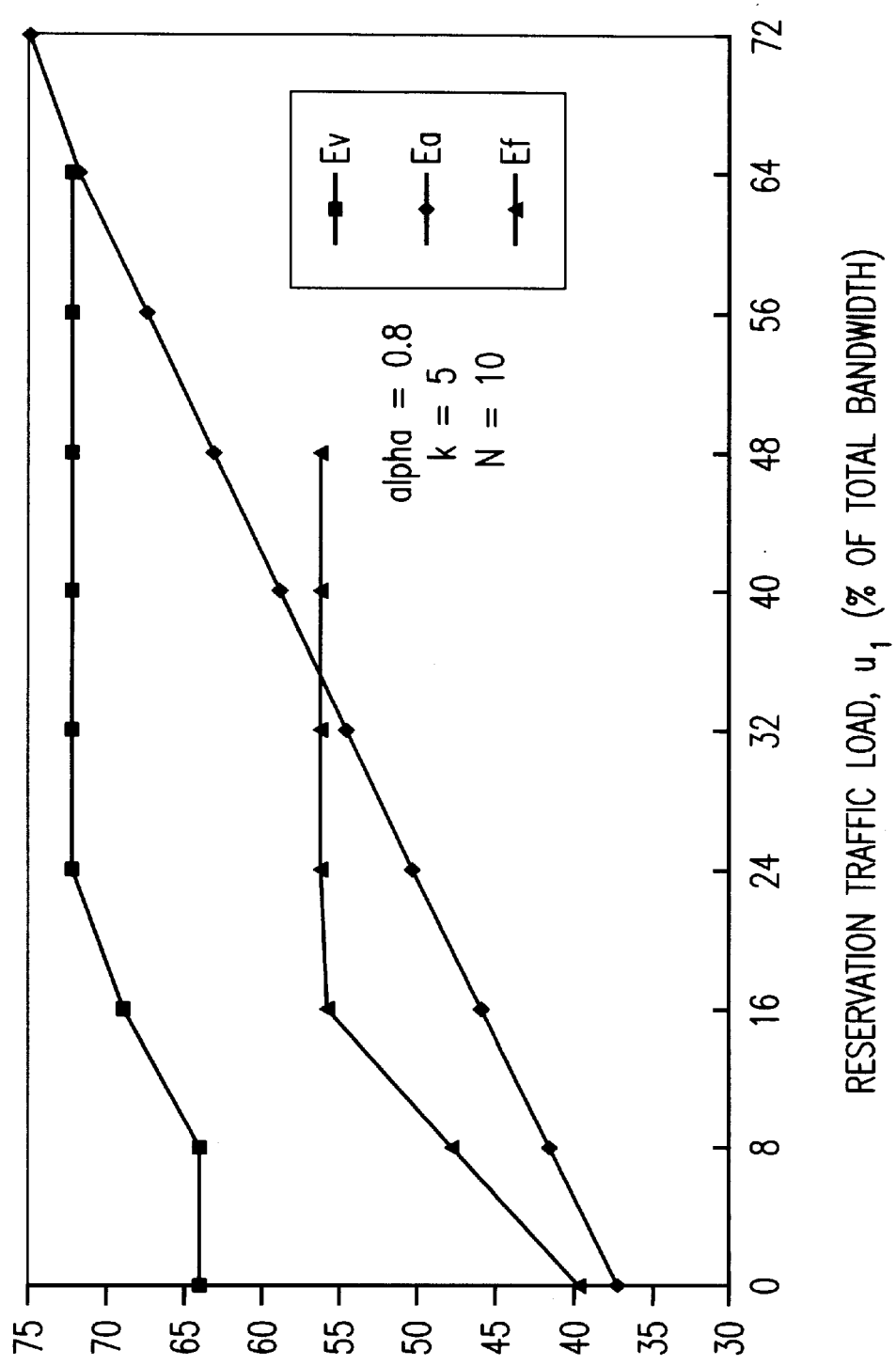

FIGS. 17–19 are illustrative comparative plots further illustrating the inventive concept for α=0.8, k=5 and N=10. FIG. 17 shows a plot of the number of ATM data slots that are converted to mini-slots versus bandwidth utilization for reservation-type traffic for a variable number of mini-slots and a fixed number of mini-slots. FIG. 18 shows a plot of contention throughput versus reservation throughput. FIG. 19 shows a plot of the total throughput versus reservation throughput. Both FIGS. 18 and 19 compare a variable number of mini-slots, a fixed number of mini-slots, and no mini-slots (e.g., the latter as described in the above-mentioned patent application of Dail et al.).

Referring now to FIGS. 20 and 21, these show illustrative block diagrams of communications equipment that incorporate the principles of the invention. Turning first to FIG. 20, there is illustrated the arrangement by which various communications devices in a station 107-$i$ of FIG. 1 are connected to the transmission network and can, in accordance with the ADAPt access protocol as modified herein, access transmission capacity in upstream channels 202 in order to communicate with head-end 109. Bandwidth controller 335 in Medium Access Control (MAC) processor 330 in a station 107-$i$, and a similar bandwidth controller 435 in MAC processor 430 in head-end 109 in FIG. 21, are arranged to implement the ADAPt access protocol as modified herein with respect to information transmission on the interconnecting tree and branch network, whereby a station 107-$i$ can insert information in a particular time slot in an upstream channel as long as the time slot is either (a) allocated to that station, or (b) a mini-slot. The communications devices in a station may include a telephone 301, a television 302, a computer 303, and many other devices. Each device is connected, for example, to a common bus 320 via an associated device specific processor 311–313. Thus, telephone 301 is coupled to bus 320 via processor 311, which, for example, converts PCM voice to and from analog signals; television 302 is coupled to bus 320 via processor 312, which, for example, converts an MPEG-2 digital TV signal to an analog signal; and computer 303 is coupled to bus 320 via processor 313 which, for example, provides conversion between user and network protocols.

With respect to upstream information, each of the device specific processors 311–313 processes the data originated in its associated communication device, and presents the data in the proper form for application to a digital transmitter 350 that enables a connection to cable 102 via a splitter/combiner 360. With respect to downstream information, each of the device specific processors 311–313 processes data destined for display/play-out at the associated communications device (telephone 301, television 302, computer 303, etc.). For example, processor 312 connected to television 302 may do MPEG-2 decoding of video information.

Transfer of data between bus 320 and a media access control (MAC) processor designated generally as 330 (described in more detail below), as well as between device specific processors 311–313 and bus 320, is performed under the control of a bus controller 322. Bus 320 and bus controller 322 may be arranged to use a standard time slot interchange (TSI) or Ethernet protocol, or any other suitable arrangement that will be apparent to a person skilled in the art.

A digital transmitter 350 and a digital receiver 340 are provided in each station to modulate upstream information and demodulate downstream information, respectively. For example, digital receiver 340 and transmitter 350 may be arranged to convert an analog signal to a digital bit stream (and vice-versa) using any of the well known techniques such as QPSK, QAM, etc. Splitter/combiner 360 operates in both directions; it extracts the signal received from head-end 109 on coax 102, and feeds it to digital receiver 340, and inserts information received from digital transmitter 350 into the coax spectrum for transmission to head-end 109. It is to be noted here that the functions performed by receiver 340, transmitter 350 and splitter/combiner 360, and potentially MAC processor 330, can be included or embodied in a single unit, sometimes referred to as a "Network Interface Unit".

Information originating in any of the communications devices 301–303 connected to bus 320 and destined for the head-end 109 of FIG. 1 is applied to cable 102 and to the other components of the transmission network under the control of MAC processor 330. Likewise, downstream information from head-end 109 that is destined for the devices 301–303 is received from the transmission network and cable 102, also under the control of MAC processor 330. The elements of MAC processor 330 are a frame demultiplexer 333 and a corresponding frame multiplexer 338, both of which operate under the control of a bandwidth controller 335, ATM and STM buffers 331 and 334, ATM and STM MAC processors 332 and 336, and a program store 337 that contains the program or software code that controls the operation of bandwidth controller 335.

Frame demux 333 reads the appropriate ATM and STM time slots in downstream frames and sends them to the ATM and STM MAC processors 332 and 336. The ATM MAC processor 332 sorts received ATM cells destined for station 107 from other traffic, and then separates payload data and the MAP messages (980 in FIG. 16) sent from head-end 109, and sends them to ATM buffers 331 and bandwidth controller 335, respectively. From ATM buffers 331, the payload data is sent to the appropriate device specific processor 311–313 over bus 320, depending upon the destination address for the communications device 301–303 that is contained in the message. For the upstream traffic, ATM MAC processor 332 processes the information from devices 301–303, and puts it in an ATM format with the appropriate ADAPt layer overhead (see FIG. 6), and presents the same to frame mux 338. Frame mux 338 performs the inverse operation relative to frame demux 333, writes the ATM and STM messages into the appropriate ATM and STM time slots, respectively, in upstream frames, using information received from the bandwidth controller 335.

Both frame mux 333 and demux 338 operate in conjunction with bandwidth controller 335, which performs processes that include (a) scheduling transmission of ATM cells or STM bursts from buffers 331 and 334 via ATM and STM MAC processors 332 and 336 to frame mux 338, and from frame mux 338 to digital transmitter 350, and (b) coordinating the STM and ATM MAC processors. ATM MAC processor 332 performs actions such as (a) generating call set-up requests through mini-slots, in accordance with the inventive concept, when calls are generated by devices 301–303, (b) controlling the contention access process, (c) following the instructions of the bandwidth controller to schedule ATM traffic, and accordingly sending ATM cells from the ATM buffers 331 to frame mux 338, (d) receiving and forwarding data in downstream ATM cells to device specific processors 311–313, and (e) generating and checking cyclical redundancy codes (CRC's) for upstream and downstream ATM traffic, respectively. STM MAC processor 336 performs processes similar to ATM MAC processor 332, with some differences as required for the STM traffic by the ADAPTt access protocol. Actions in bandwidth controller 335 are coordinated with those in bandwidth controller 435 in head-end 109. Buffers 331 and 334 are arranged to store ATM and STM payload data on a temporary basis, and to store parameter information used in the bandwidth allocation and management processes that form part of the ADAPt access protocol.

FIG. 21 illustrates the arrangement of a MAC processor 430, which is similar to MAC processor 330 shown in FIG. 20. MAC processor 430 is disposed in head-end 109 of FIG. 1, and directs communications signals from stations 107 to appropriate service platforms 490. As shown in FIG. 21, signals received from stations 107 via coaxial cable 102 are applied to splitter/combiner 472, which, like unit 360, extracts the upstream signals from coax 102 and presents those signals to digital receiver 470. Splitter/combiner 472 also inserts signals received from digital transmitter 474 and CATV entertainment signals 110, onto the coax 102 for transmission to stations 107. Digital receiver 470 may also provide COLLISION or IDLE status detection, by using (a) power level analysis, and/or (b) digital error detection, and/or (c) other techniques. If these functions are performed in digital receiver 470, the resulting control signals are communicated to the ATM and STM MAC processors 432 and 436.

Frame demux 433 reads the appropriate ATM and STM time slots in upstream frames and sends them to ATM and STM MAC processors 432 and 436. ATM MAC processor 432 separates payload data and the signaling messages sent from stations 107, and sends them to ATM buffers 431 and bandwidth controller 435, respectively. ATM MAC processor 432 also distinguishes between reservation and contention ATM cells. A call set-up request is processed by negotiation between MAC processor 430, service gateway 486, and service platform 490, and thus a connection is established between a station and a service platform. After call establishment, the payload data from ATM buffers 431 are sent to the appropriate service platforms 490 via the service gateway 486.

For the downstream traffic, ATM MAC processor 432 processes information, which pertains to an ATM call and is received from a service platform 490, and puts it in an ATM format (if not already in that format) with the appropriate MAC layer overhead (see FIG. 6), and presents the same to frame mux 438. Frame mux 438 performs the inverse operation relative to frame demux 433; it writes ATM and STM information into the appropriate time slots assigned to ATM and STM calls, and the control/status messages into the MAP field in the downstream frame (980 in FIG. 16). The insertion of information messages into specific time slots of a downstream frame occurs in accordance with time slot allocations made by bandwidth controller 435, and communicated to the STM and ATM processors 436 and 432. For example, Bandwidth controller 435 not only executes the algorithms as described in the above-mentioned patent of Dail et al., but also dynamically assigns mini-slots in each frame using, for example, the method shown in FIG. 13.

Both frame mux 438 and frame demux 433 operate in conjunction with bandwidth controller 435 and ATM & STM MAC processors 432 and 436. The tasks accomplished by the bandwidth controller 435 are: (a) call admission control and bandwidth allocation on the fiber/coax in upstream and downstream directions in accordance with the principles of the invention, (b) scheduling transmission of ATM cells or STM bursts from buffers 431 and 434 via ATM and STM MAC processors 432 and 436 to frame mux 438, and from frame mux 438 to digital transmitter 474, and (c) coordinating the STM and the ATM MAC processors 436 and 432. ATM MAC processor 432 performs actions such as (a) generating ATM call set-up requests when calls are generated by a network (111, 112 in FIG. 1) via service platforms 490, (b) controlling the ATM contention access process and generating acknowledgments for inclusion in downstream MAP 980, (c) following the instructions of bandwidth controller 435 to schedule ATM traffic, and accordingly sending ATM cells from the ATM buffers 431 to frame mux 438, (d) receiving and forwarding data in upstream ATM cells to service gateway 486 via ATM buffers 431, (e) generating and checking cyclic redundancy codes (CRC's) for downstream and upstream ATM traffic, respectively. STM MAC processor 436 performs processes similar to ATM MAC processor 432, with some differences as required for the STM traffic by the ADAPt protocol. The details of these processes, as stated previously, are described in the above-mentioned patent application of Dail et al. Buffers 431 and 434 are arranged to store ATM and STM payload data on a temporary basis, and to store parameter information used in the bandwidth allocation and management processes that form part of the ADAPt protocol.

Service gateway 486 shown in FIG. 21 maintains information regarding subscribers, service providers, and routing information for their services platforms, and provides an interface between MAC processor 430 and service platforms 490. These service platforms can be located at separate sites apart from head-end 109, and therefore illustratively are interconnected with gateway 486 via a public switched telecommunications network (PSTN) 111 or an ATM network 112 (see FIG. 1). Gateway 486 operates in conjunction with the MAC processor to recognize the needs of different applications originating from stations 107, and routes communications signals corresponding to these different applications to appropriate ones of the service platforms 490. For example, video on demand (VOD) requests originated in a station 107 would be routed through service gateway 486 to a VOD service platform, while voice calls would be routed through the gateway 486 to a LEC (e.g., telephone company) switch, which acts as a different type of service platform for voice calls.

The foregoing merely illustrates the principles of the invention and it will thus be appreciated that those skilled in the art will be able to devise numerous alternative arrangements which, although not explicitly described herein, embody the principles of the invention and are within its spirit and scope.

For example, different classifications of traffic mix can be defined, and/or existing traffic classifications can be refined, such as dividing the above-described contention-type traffic into other traffic types. Such additional classifications would require corresponding modifications to the above-described algorithms.

Further, while our invention has thus far been primarily described in the context of a fiber/coax based transmission infrastructure, it is to be understood that the invention is also applicable to a wireless communications environment. In the latter situation, the terms "mobile station", "base station" and "wireless medium", would be applicable in place of the terms "station", "head-end" and "fiber/coax medium".

Also, because the current trend is to support packet mode applications using the ATM protocol, the inventive concept was described in the context of ATM. However, it is to be understood that other packet mode protocols may use this invention.

What is claimed is:

1. An improved method for use in the transport of different types of information via an access protocol, the access protocol defining a time frame that includes a plurality of data time slots for transporting the different types of information; the improvement comprising the step of:

using a number of the data time slots in each time frame for conveying transmission requests via mini-slots in each of the number of data time slots; and varying the number of data slots in future time frames that are used for conveying transmission requests as a function of a priori knowledge of multi-cell message size distribution.

2. An improved method for use in the transport of different types of information via an access protocol, the access protocol defining a time frame that includes a plurality of data time slots for transporting the different types of information; the improvement comprising the step of:

using a number of the data time slots in each time frame for conveying transmission requests via mini-slots in each of the number of data time slots; and varying the number of data slots in future time frames that are used for conveying transmission requests as a function of the different types of information conveyed in at least one previous time-frame.

3. A method of allocating transmission bandwidth among multiple stations interconnected with a common controller via a transmission medium having a multiple access upstream channel, said method comprising the steps of:

dividing time in said upstream channel on said transmission medium into a series of successive time frames;

dividing each of said time frames into at least one region comprising more than one data time slot; and allocating, in each of said time frames, a number, n, of said data time slots to carry mini-slots wherein each such allocated data time slot is further divided into a number of smaller time slots, each smaller time slot being a mini-slot, and where n is greater than 0;

wherein the allocating step includes the steps of characterizing said upstream traffic into a plurality of different types, said different types including at least a short message type; and adjusting said number n in a time frame as a function of a number of messages of short message type occurring in at least one previous time frame.

4. A method of allocating transmission bandwidth among multiple stations interconnected with a common controller via a transmission medium having a multiple access upstream channel, said method comprising the steps of:

dividing time in said upstream channel on said transmission medium into a series of successive time frames;

dividing each of said time frames into at least one region comprising more than one data time slot; and allocating, in each of said time frames, a number, n, of said data time slots to carry mini-slots wherein each such allocated data time slot is further divided into a number of smaller time slots, each smaller time slot being a mini-slot, and where n is greater than 0;

wherein the allocating step includes the steps of characterizing said upstream traffic into a plurality of different types, said different types including at least a long message type; and adjusting said number n in a time frame as a function of a number of message of long message type occurring in at least one previous time frame.

5. A method of allocating transmission bandwidth among multiple stations interconnected with a common controller via a transmission medium having a multiple access upstream channel, said method comprising the steps of:

dividing time in said upstream channel on said transmission medium into a series of successive time frames;

dividing each of said time frames into at least one region comprising more than one data time slot; and allocating, in each of said time frames, a number, n, of said data time slots to carry mini-slots wherein each such allocated data time slot is further divided into a number of smaller time slots, each smaller time slot being a mini-slot, and where n is greater than 0;

wherein the allocating step includes the steps of characterizing said upstream traffic into a plurality of different types, said different types including at least a contention message type; and adjusting said number n in a time frame as a function of a number of messages of contention message type occurring in at least one previous time frame.

6. A method of allocating transmission bandwidth among multiple stations interconnected with a common controller via a transmission medium having a multiple access upstream channel, said method comprising the steps of:

dividing time in said upstream channel on said transmission medium into a series of successive time frames;

dividing each of said time frames into at least one region comprising more than one data time slot; and allocating, in each of said time frames, a number, n, of said data time slots to carry mini-slots wherein each such allocated data time slot is further divided into a number of smaller time slots, each smaller time slot being a mini-slot, and where n is greater than 0;

wherein the allocating step includes the steps of characterizing said upstream traffic into a plurality of different types, said different types including at least a reservation message type; and adjusting said number n in a time frame as a function of a number of messages of reservation message type occurring in at least one previous time frame.

7. A method of allocating transmission bandwidth among multiple stations interconnected with a common controller via a transmission medium having a multiple access upstream channel, said method comprising the steps of:

dividing time in said upstream channel on said transmission medium into a series of successive time frames;

dividing each of said time frames into at least one region comprising more than one data time slot; and allocating, in each of said time frames, a number, n, of said data time slots to carry mini-slots wherein each such allocated data time slot is further divided into a number of smaller time slots, each smaller time slot being a mini-slot, and where n is greater than 0;

wherein the allocating step includes the steps of characterizing said upstream traffic into a plurality of different types, said different types including at least a delay tolerant message type; and adjusting said number n in a time frame as a function of a number of messages of delay tolerant message type occurring in at least one previous time frame.

8. A method of allocating transmission bandwidth among multiple stations interconnected with a common controller via a transmission medium having a multiple access upstream channel, said method comprising the steps of:

dividing time in said upstream channel on said transmission medium into a series of successive time frames;

dividing each of said time frames into at least one region comprising more than one data time slot; and allocating, in each of said time frames, a number, n, of said data time slots to carry mini-slots wherein each such allocated data time slot is further divided into a number of smaller time slots, each smaller time slot being a mini-slot, and where n is greater than 0;

wherein the allocating step includes the steps of characterizing said upstream traffic into a plurality of different types, said different types including at least a delay sensitive message type; and adjusting said number n in a time frame as a function of a number of messages of delay sensitive message type occurring in at least one previous time frame.

9. A method of allocating transmission bandwidth among multiple stations handling ATM calls, said stations being interconnected with a common controller via a transmission medium having a multiple access upstream channel, said method comprising the steps of:

dividing time in said upstream channel on said transmission medium into a series of successive time frames;

dividing each of said time frames into a plurality of time slots, N; and allocating a portion, n, of the N time slots to convey transmission requests, the remaining portion N-n of the time slots available for transporting a traffic mix of different types of information;

wherein the allocating step allocates the portion, n, as a function of the traffic mix in at least one previous time frame.

10. An improved head-end for use in the transport of different types of information via an access protocol, the access protocol defining a time frame that includes a plurality of data time slots for transporting the different types of information, the improved head-end comprising:

a controller that allocates a number, n, of the data time slots in each time frame for conveying transmission requests via mini-slots in each of the number of data time slots, n;

wherein the controller allocates the number n as a function of the different types of information conveyed in at least one previous time-frame.

11. An improved head-end for use in the transport of different types of information via an access protocol, the access protocol defining a time frame that includes a plurality of data time slots for transporting the different types of information; the improved head-end comprising:

a controller that a) uses a number, n, of the data time slots in a received time frame for receiving transmission requests via mini-slots in each of the number, n, of data time slots, and b) dynamically changes the number of data slots, n, used in a next time frame as a function of the different types of information conveyed in at least one previous time-frame.

12. A broadband network comprising:

a plurality of multiple stations coupled to the broadband network for communicating via an access protocol, the access protocol defining a plurality of time frames, each time frame divided into a plurality, N, of data time slots such that n of the N data time slots are used by the multiple stations for requesting transmission where each such n data time slot is divided into a plurality of smaller time slots, each smaller time slot being capable of conveying one such transmission request; and a head-end that controls the allocation of the n data time slots in a time frame as a function of upstream traffic over a period of time wherein the head-end a) characterizes said upstream traffic into a plurality of different types, said different types including at least a short message type, and b) adjusts said number n in a next time frame as a function of a number of messages of short message types occurring in at least one previous time frame.

13. A broadband network comprising:

a plurality of multiple stations coupled to the broadband network for communicating via an access protocol, the access protocol defining a plurality of time frames, each time frame divided into a plurality, N, of data time slots such that n of the N data time slots are used by the multiple stations for requesting transmission where each such n data time slot is divided into a plurality of smaller time slots, each smaller time slot being capable of conveying one such transmission request; and a head-end that controls the allocation of the n data time slots in a time frame as a function of upstream traffic over a period of time wherein the head-end a) characterizes said upstream traffic into a plurality of different types, said different types including at least a long message type, and b) adjusts said number n in a next time frame as a function of a number of messages of long message type occurring in at least one previous time frame.

14. A broadband network comprising:

a plurality of multiple stations coupled to the broadband network for communicating via an access protocol, the access protocol defining a plurality of time frames, each time frame divided into a plurality, N, of data time slots such that n of the N data time slots are used by the multiple stations for requesting transmission where each such n data time slot is divided into a plurality of smaller time slots, each smaller time slot being capable of conveying one such transmission request; and a head-end that controls the allocation of the n data time slots in a time frame as a function of upstream traffic over a period of time wherein the head-end a) characterizes said upstream traffic into a plurality of different types, said different types including at least a contention message type, and b) adjusts said number n in a next time frame as a function of a number of messages of contention message type occurring in at least one previous time frame.

15. A broadband network comprising:

a plurality of multiple stations coupled to the broadband network for communicating via an access protocol, the access protocol defining a plurality of time frames, each time frame divided into a plurality, N, of data time slots such that n of the N data time slots are used by the multiple stations for requesting transmission where each such n data time slot is divided into a plurality of smaller time slots, each smaller time slot being capable of conveying one such transmission request; and a head-end that controls the allocation of the n data time slots in a time frame as a function of upstream traffic over a period of time wherein the head-end a) characterizes said upstream traffic into a plurality of different types, said different types including at least a reservation message type, and b) adjusts said number n in a next time frame as a function of a number of messages of reservation message type occurring in at least one previous time frame.

16. A broadband network comprising:

a plurality of multiple stations coupled to the broadband network for communicating via an access protocol, the access protocol defining a plurality of time frames, each time frame divided into a plurality, N, of data time slots such that n of the N data time slots are used by the multiple stations for requesting transmission where each such n data time slot is divided into a plurality of smaller time slots, each smaller time slot being capable of conveying one such transmission request; and a head-end that controls the allocation of the n data time slots in a time frame as a function of upstream traffic over a period of time wherein the head-end a) characterizes said upstream traffic into a plurality of different types, said different types including at least a delay tolerant message type, b) adjusts said number n in a next time frame as a function of a number of messages of delay tolerant message type occurring in at least one previous time frame.

17. A broadband network comprising:

a plurality of multiple stations coupled to the broadband network for communicating via an access protocol, the access protocol defining a plurality of time frames, each time frame divided into a plurality, N, of data time slots such that n of the N data time slots are used by the multiple stations for requesting transmission where each such n data time slot is divided into a plurality of smaller time slots, each smaller time slot being capable of conveying one such transmission request; and a head-end that controls the allocation of the n data time slots in a time frame as a function of upstream traffic over a period of time wherein the head-end a) characterizes said upstream traffic into a plurality of different types, said different types including at least a delay sensitive message type, and b) adjusts said number n in a next time frame as a function of a number of message of delay sensitive message type occurring in at least one previous time frame.

18. A head end apparatus for use in a broadband network, the head end comprising:

receiving circuitry for receiving a signal representing a sequence of time frames, each time frame comprising a plurality, N, of data time slots, where n of the data time slots are further divided into smaller time slots, each such smaller time slot capable of conveying a transmission request from any one of a number of downstream stations; and controller circuitry for adjusting the number n as a function of upstream traffic communicated from the downstream stations over a period of time wherein the controller circuitry adjusts the number n as a function of upstream traffic by determining a number of messages of short message type occurring in at least one previous time frame and adjusting the number n as a function thereof.

19. A head end apparatus for use in a broadband network, the head end comprising:

receiving circuitry for receiving a signal representing a sequence of time frames, each time frame comprising a plurality, N, of data time slots, where n of the data time slots are further divided into smaller time slots, each such smaller time slot capable of conveying a transmission request from any one of a number of downstream stations; and controller circuitry for adjusting the number n as a function of upstream traffic communicated from the downstream stations over a period of time wherein the controller circuitry adjusts the number n as a function of upstream traffic by determining a number of messages of long message type occurring in at least one previous time frame and adjusting the number n as a function thereof.

20. A head end apparatus for use in a broadband network, the head end comprising:

receiving circuitry for receiving a signal representing a sequence of time frames, each time frame comprising a plurality, N, of data time slots, where n of the data time slots are further divided into smaller time slots, each such smaller time slot capable of conveying a transmission request from any one of a number of downstream stations; and controller circuitry for adjusting the number n as a function of upstream traffic communicated from the downstream stations over a period of time wherein the controller circuitry adjusts the number n as a function of upstream traffic by determining a number of messages of contention message type occurring in at least one previous time frame and adjusting the number n as a function thereof.

21. A head end apparatus for use in a broadband network, the head end comprising:

receiving circuitry for receiving a signal representing a sequence of time frames, each time frame comprising a plurality, N, of data time slots, where n of the data time slots are further divided into smaller time slots, each such smaller time slot capable of conveying a transmission request from any one of a number of downstream stations; and controller circuitry for adjusting the number n as a function of upstream traffic communicated from the downstream stations over a period of time wherein the controller circuitry adjusts the number n as a function of upstream traffic by determining a number of messages of reservation message type occurring in at least one previous time frame and adjusting the number n as a function thereof.

22. A head end apparatus for use in a broadband network, the head end comprising:

receiving circuitry for receiving a signal representing a sequence of time frames, each time frame comprising a plurality, N, of data time slots, where n of the data time slots are further divided into smaller time slots, each such smaller time slot capable of conveying a transmission request from any one of a number of downstream stations; and controller circuitry for adjusting the number n as a function of upstream traffic communicated from the downstream stations over a period of time wherein the controller circuitry adjusts the number n as a function of upstream traffic by determining a number of messages of delay tolerant message type occurring in at least one previous time frame and adjusting the number n as a function thereof.

23. A head end apparatus for use in a broadband network, the head end comprising:

receiving circuitry for receiving a signal representing a sequence of time frames, each time frame comprising a plurality, N, of data time slots, where n of the data time slots are further divided into smaller time slots, each such smaller time slot capable of conveying a transmission request from any one of a number of downstream stations; and controller circuitry for adjusting the number n as a function of upstream traffic communicated from the downstream stations over a period of time wherein the controller circuitry adjusts the number n as a function of upstream traffic by determining a number of message of delay sensitive message type occurring in at least one previous time frame and adjusting the number n as a function thereof.

* * * * *